(12) United States Patent
Pirie et al.

(10) Patent No.: US 6,371,672 B1
(45) Date of Patent: Apr. 16, 2002

(54) IMAGER FEATURING SERVICE STATION ASSEMBLY WITH INTERFACE BOARD AND CARTRIDGE ASSEMBLY WITH CUSTOMIZED RASTERIZER AND PEN DRIVER BOARDS

(75) Inventors: David M. Pirie, Norwich, CT (US); Todd M. Rearick, North Kingstown, RI (US); George M. Sawyer, Norwich, CT (US)

(73) Assignee: Gunther International, Ltd., Norwich, CT (US)

( * ) Notice: Subject to any disclaimer, the term of this patent is extended or adjusted under 35 U.S.C. 154(b) by 0 days.

(21) Appl. No.: 09/187,917

(22) Filed: Nov. 6, 1998

(51) Int. Cl.[7] .......................... B41J 29/02; B41J 29/393
(52) U.S. Cl. ........................................ 400/692; 347/19
(58) Field of Search ...................... 347/20, 19; 400/692

(56) References Cited

U.S. PATENT DOCUMENTS

| | | | | |
|---|---|---|---|---|
| 5,854,886 A | * | 12/1998 | MacMillan et al. | 395/114 |
| 5,923,820 A | * | 7/1999 | Cunnagin et al. | 395/108 |
| 5,984,446 A | * | 11/1999 | Silverbrook | 347/3 |

FOREIGN PATENT DOCUMENTS

| JP | 410006505 A | * | 1/1998 |
|---|---|---|---|

OTHER PUBLICATIONS

Photo No. 1 of the prior art device described in the background of the patent application.
Photo No. 2 of the prior art device described in the background of the patent application.
Photo No. 3 of the prior art device described in the background of the patent application.
"Ink Jet Controls", 2 pages, PRISM, Inc. (undated).
"To Us, The Image Is Everything", 4 pages, PRISM, Inc. (undated).
"High Speed High Quality Ink Jet Addressing, Bryce 20K Print Station," 2 pages, Datatech (Undated).

* cited by examiner

Primary Examiner—John S. Hilten
Assistant Examiner—Charles H. Nolan, Jr.
(74) Attorney, Agent, or Firm—Ware, Fressola, Van Der Sluys & Adolphson LLP

(57) ABSTRACT

The present invention provides a modular imager having a service station assembly with a customized interface board, and also having a cartridge assembly with a customized rasterizer board and a customized pen driver board. The customized interface board has a controller that responds to an image signal having any one of a number of different standard interfaces, for providing an interface board image signal. The customized rasterizer board has a programmable logic device (i.e. firmware), responds to the interface board image signal, rasterizes the interface board image signal into a bitmap, and provides a rasterizer board image signal. The customized pen driver board has a programmable logic device (i.e. firmware), responds to the rasterizer board image signal, remaps the rasterizer board image signal, and provides a pen driver board signal.

23 Claims, 18 Drawing Sheets

(Pen Driver Board)

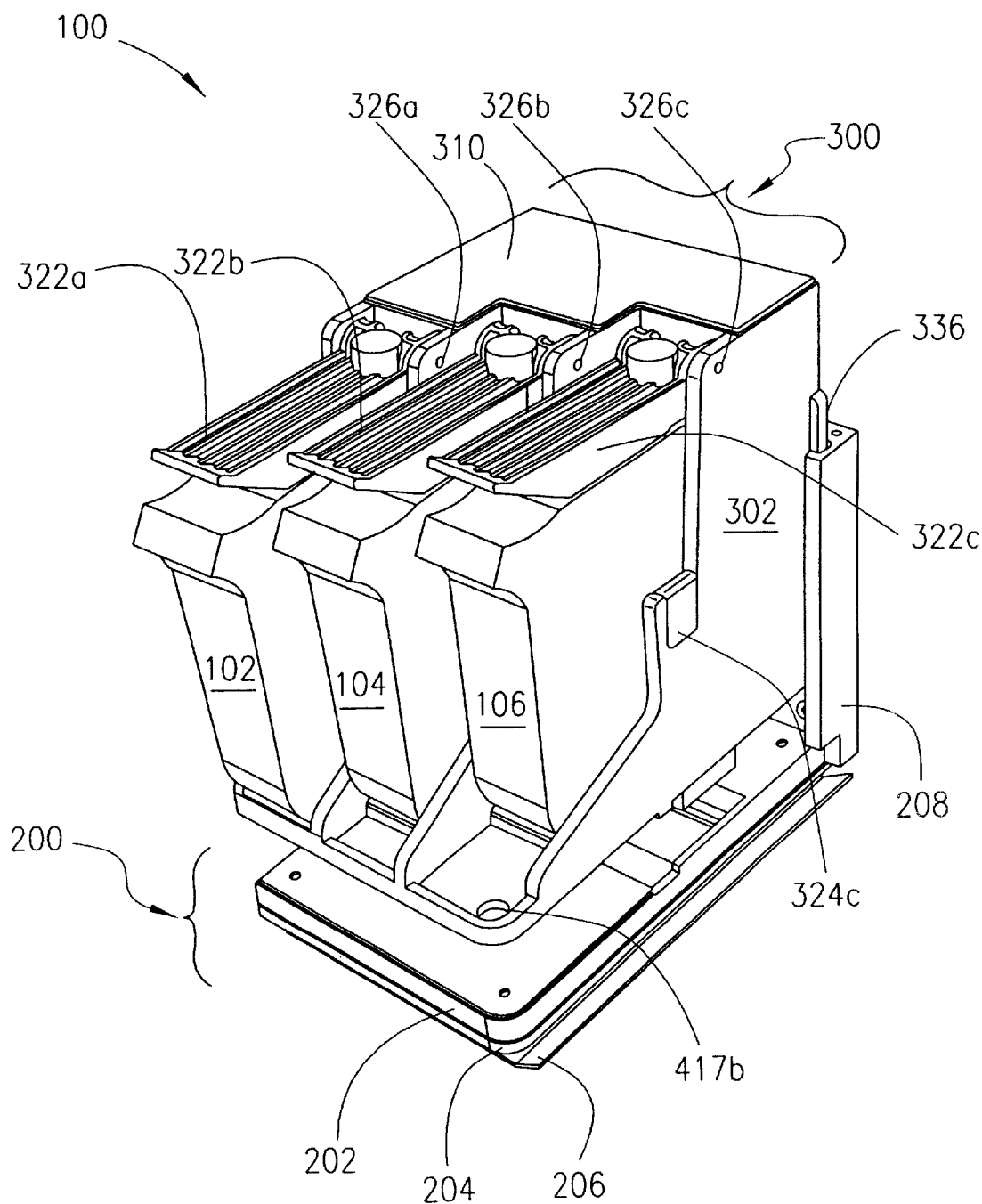
FIG. 1A (Imager)

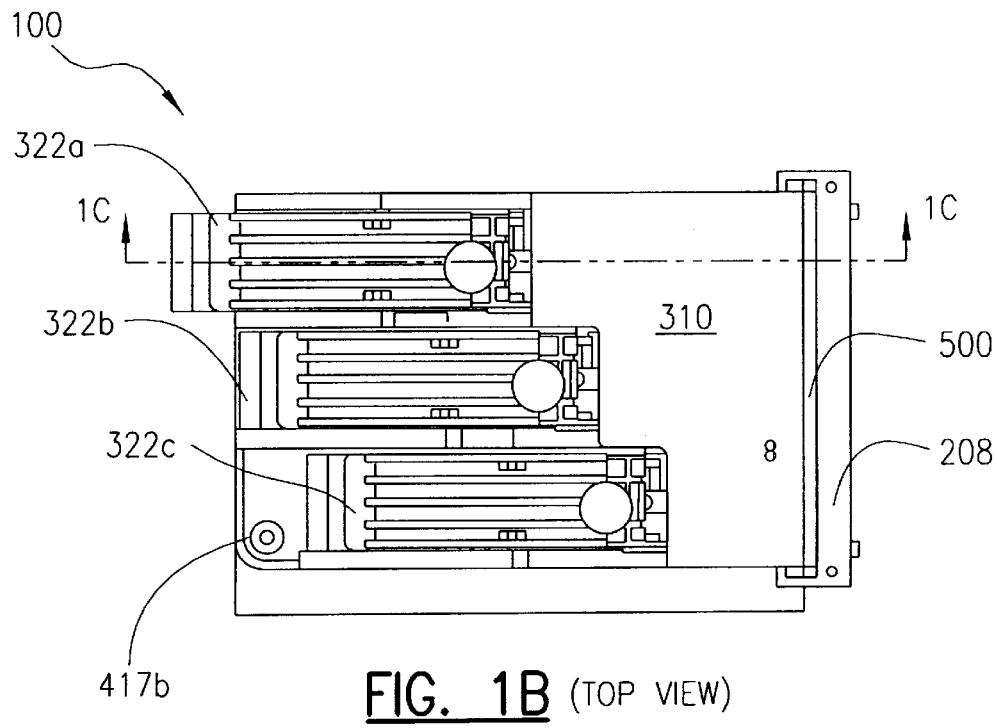
FIG. 1B (TOP VIEW)
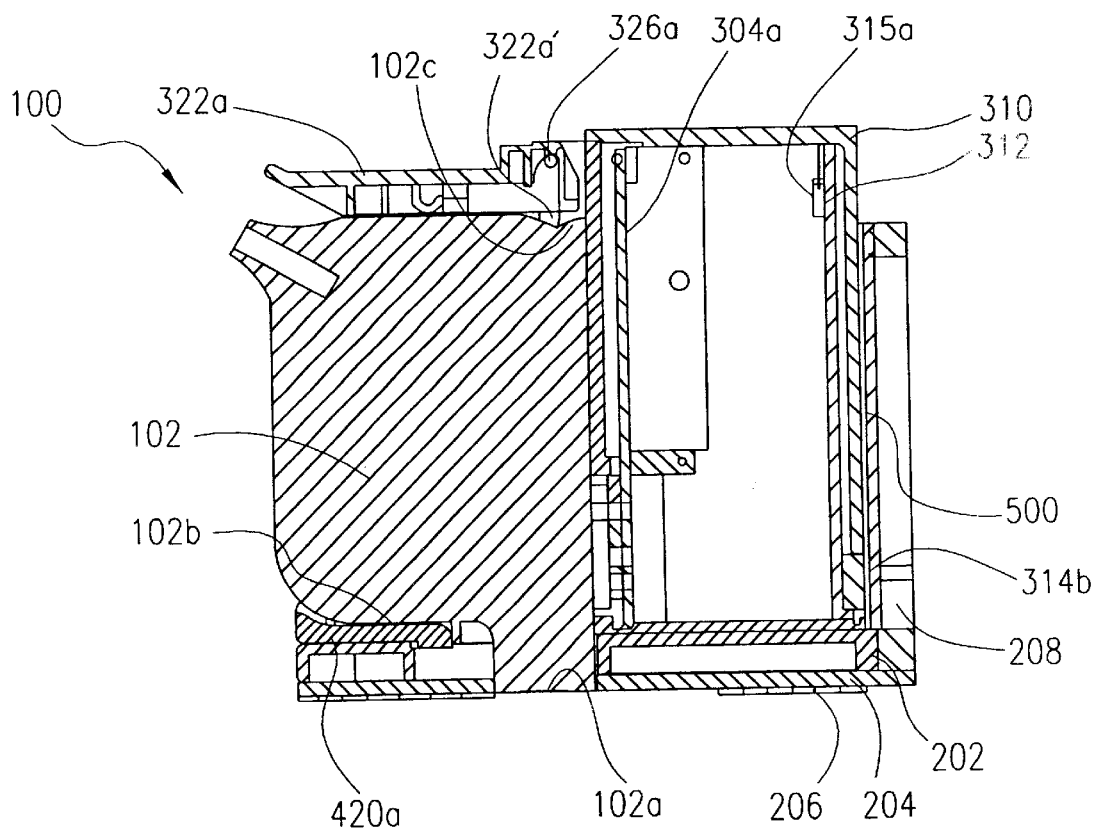
FIG. 1C

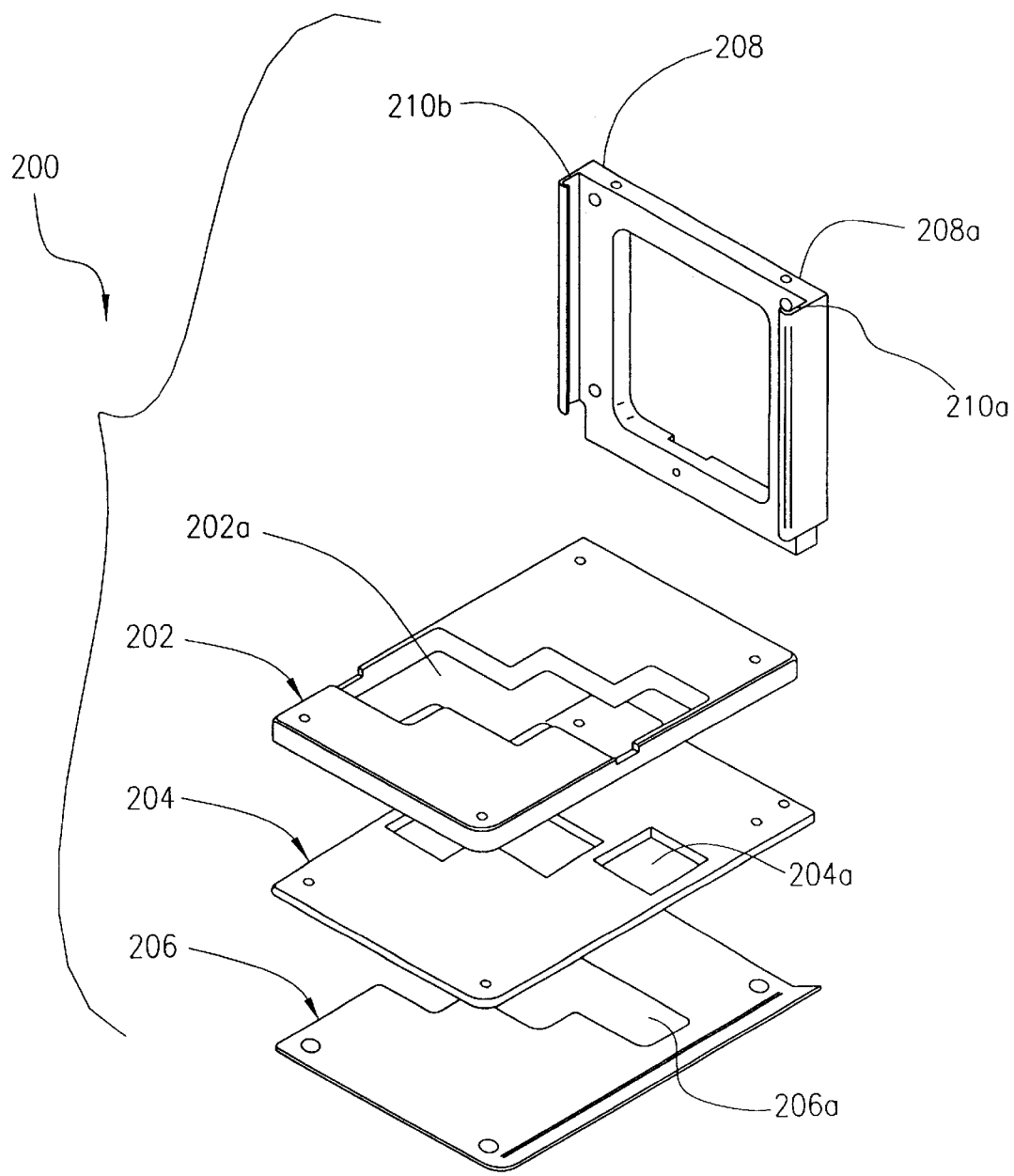
FIG. 2A (Service Station Assembly)

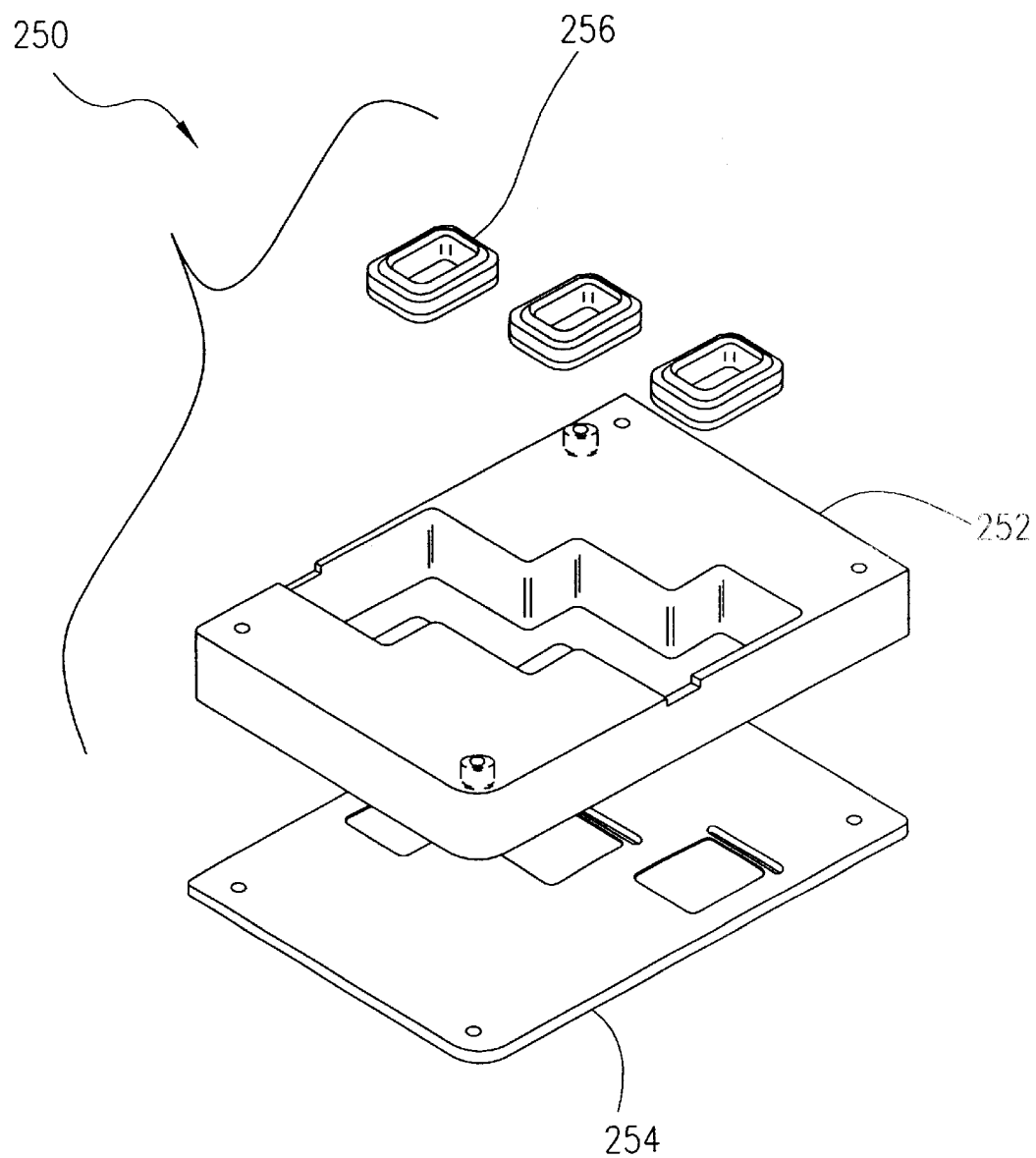
FIG. 2B (Capping Station Assembly)

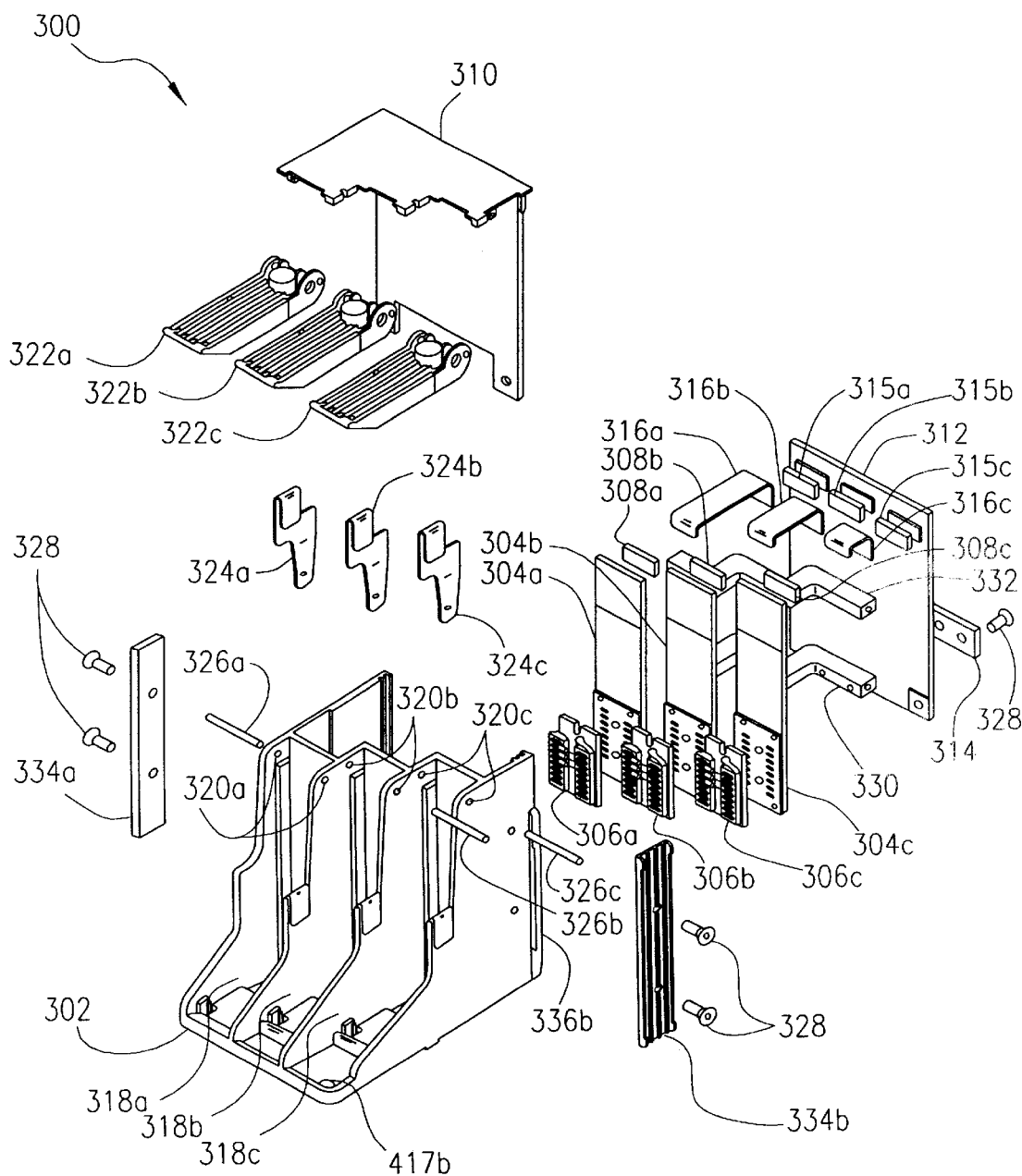
FIG. 3 (Cartridge Assembly)

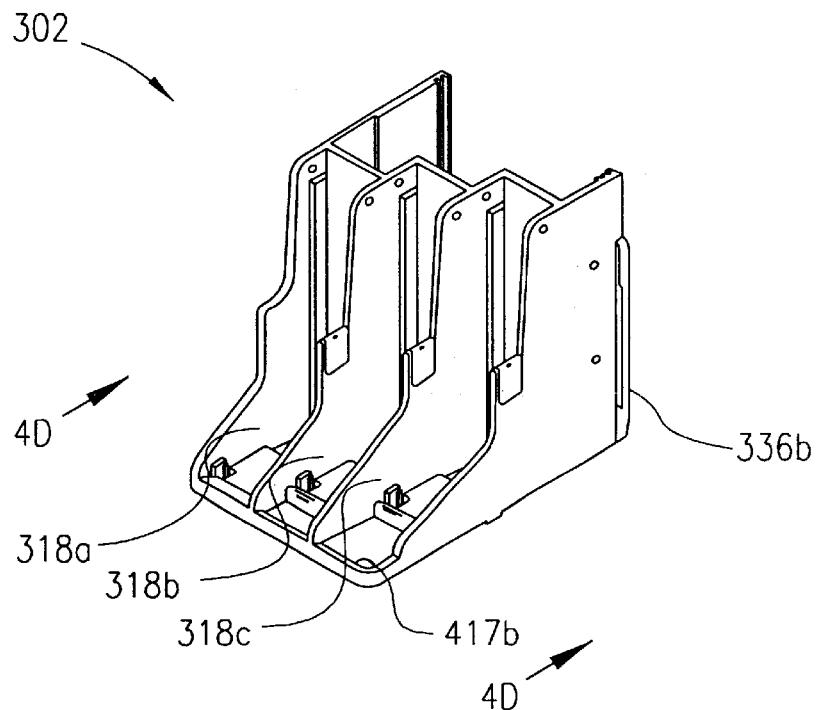
FIG. 4A (Three Pen Imager Cartridge)
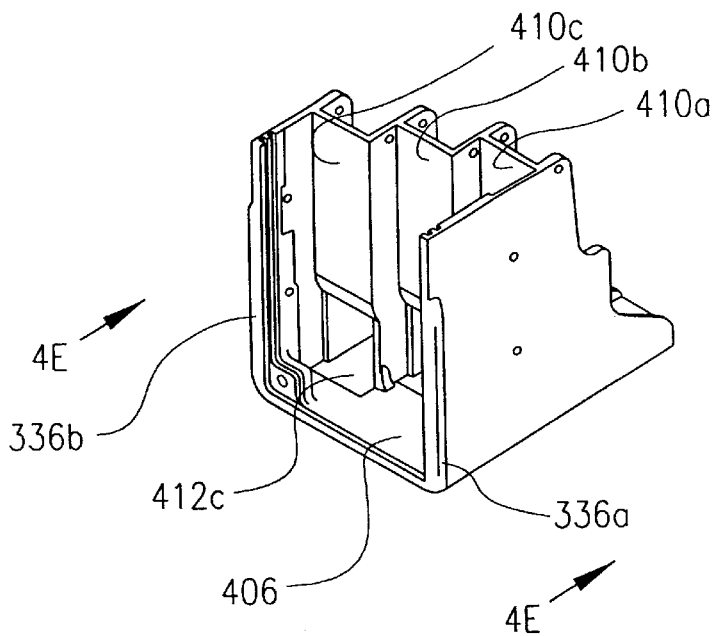
FIG. 4B

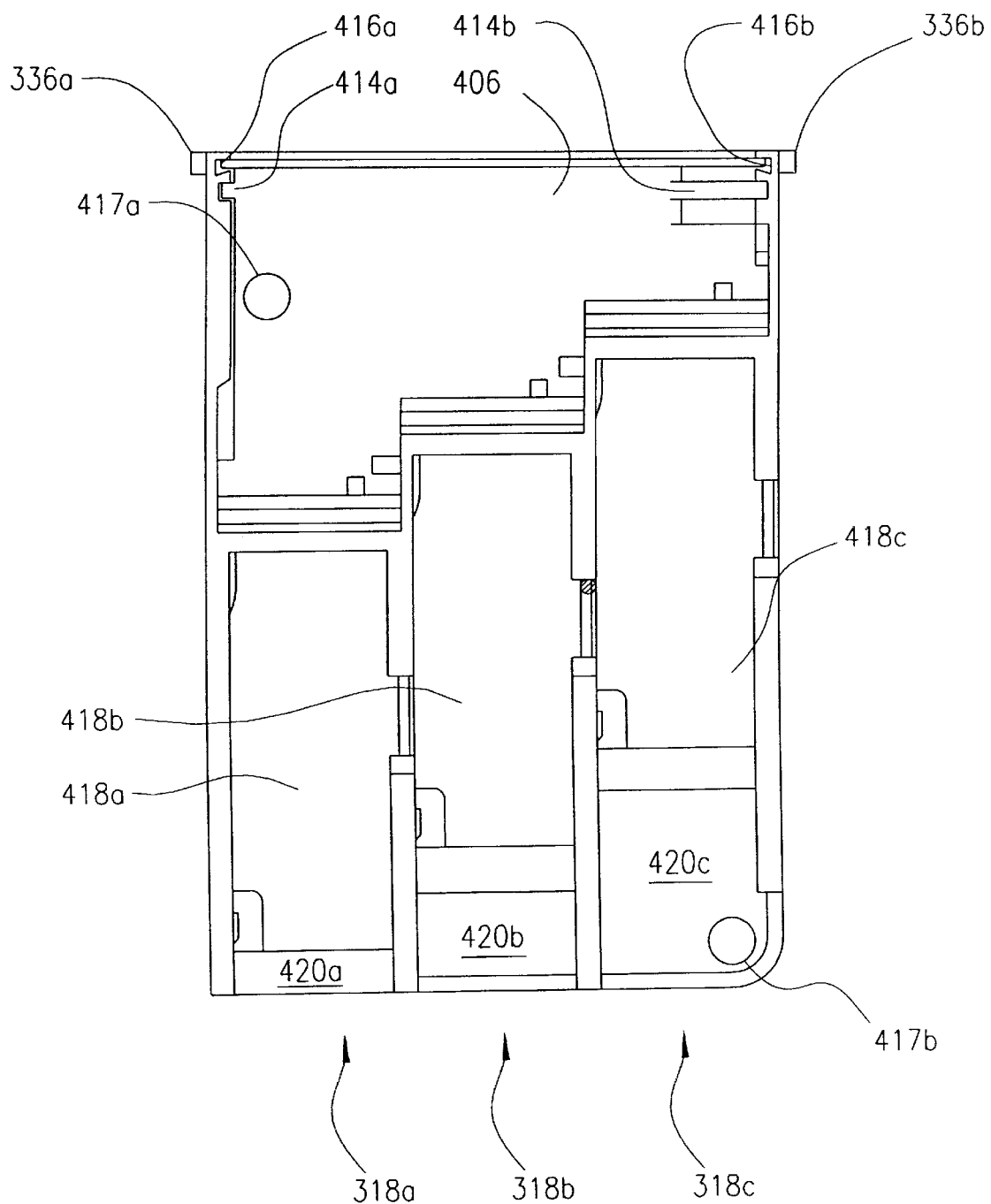
FIG. 4C (Top View)

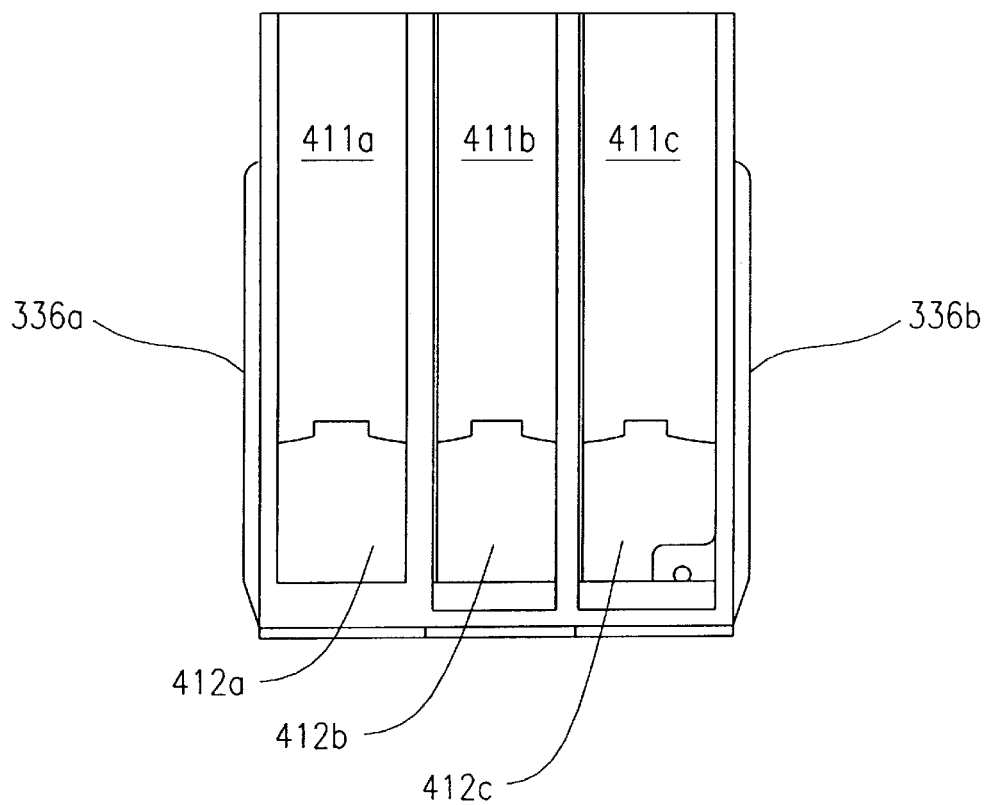
FIG. 4D (Front View)
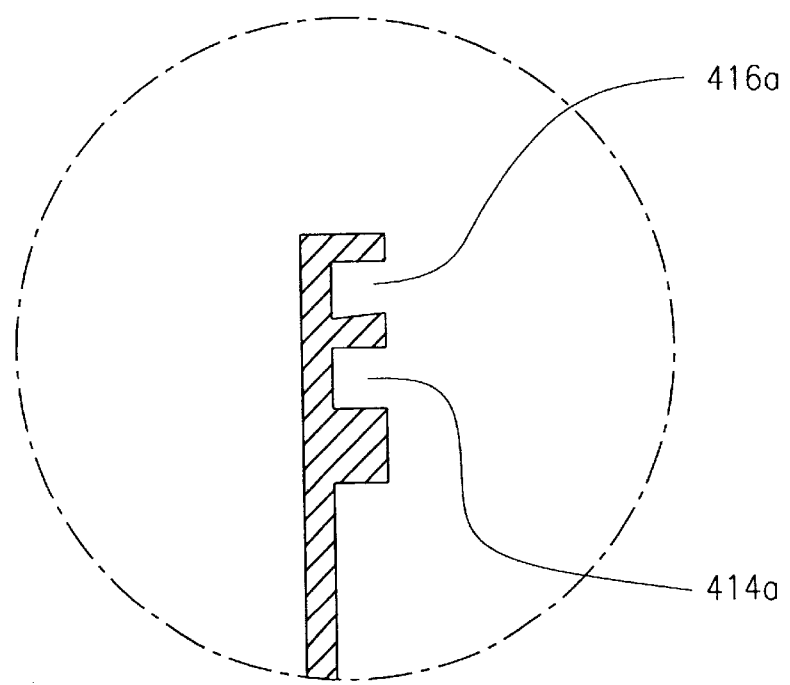
FIG. 4G

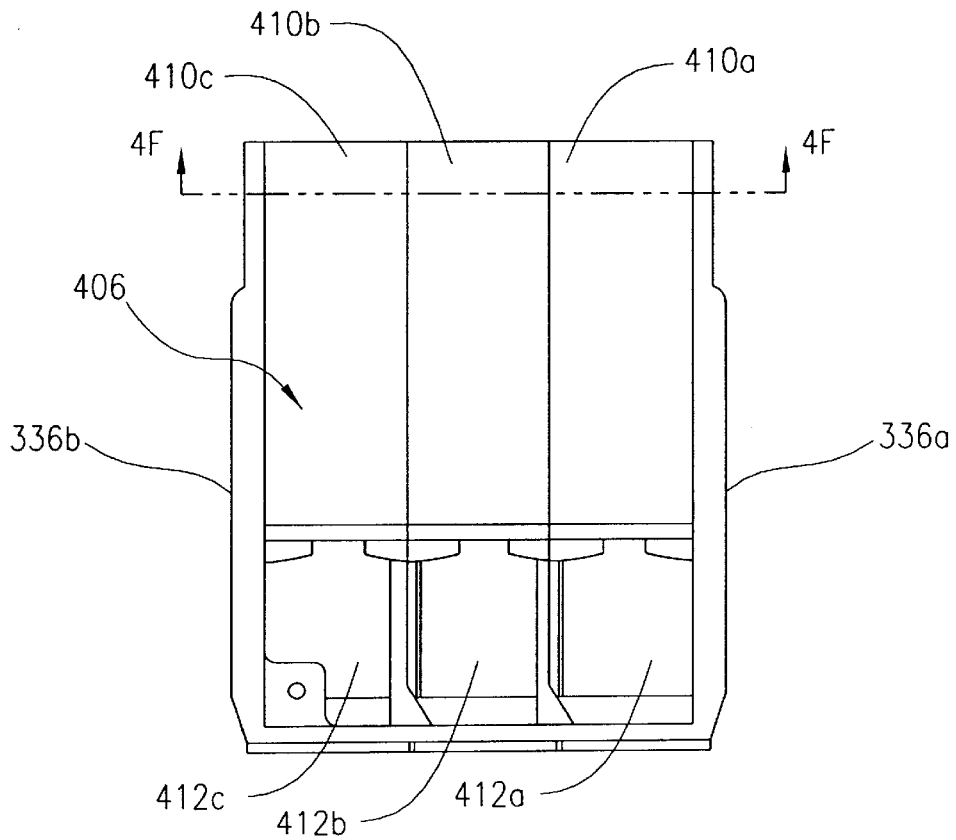
FIG. 4E (Back View)
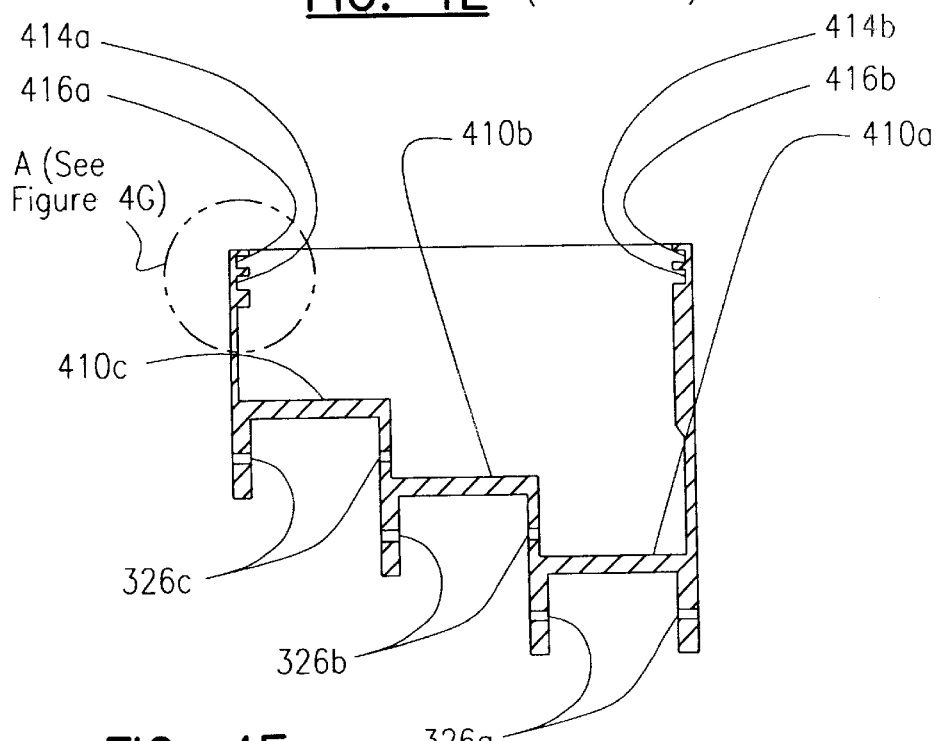
FIG. 4F

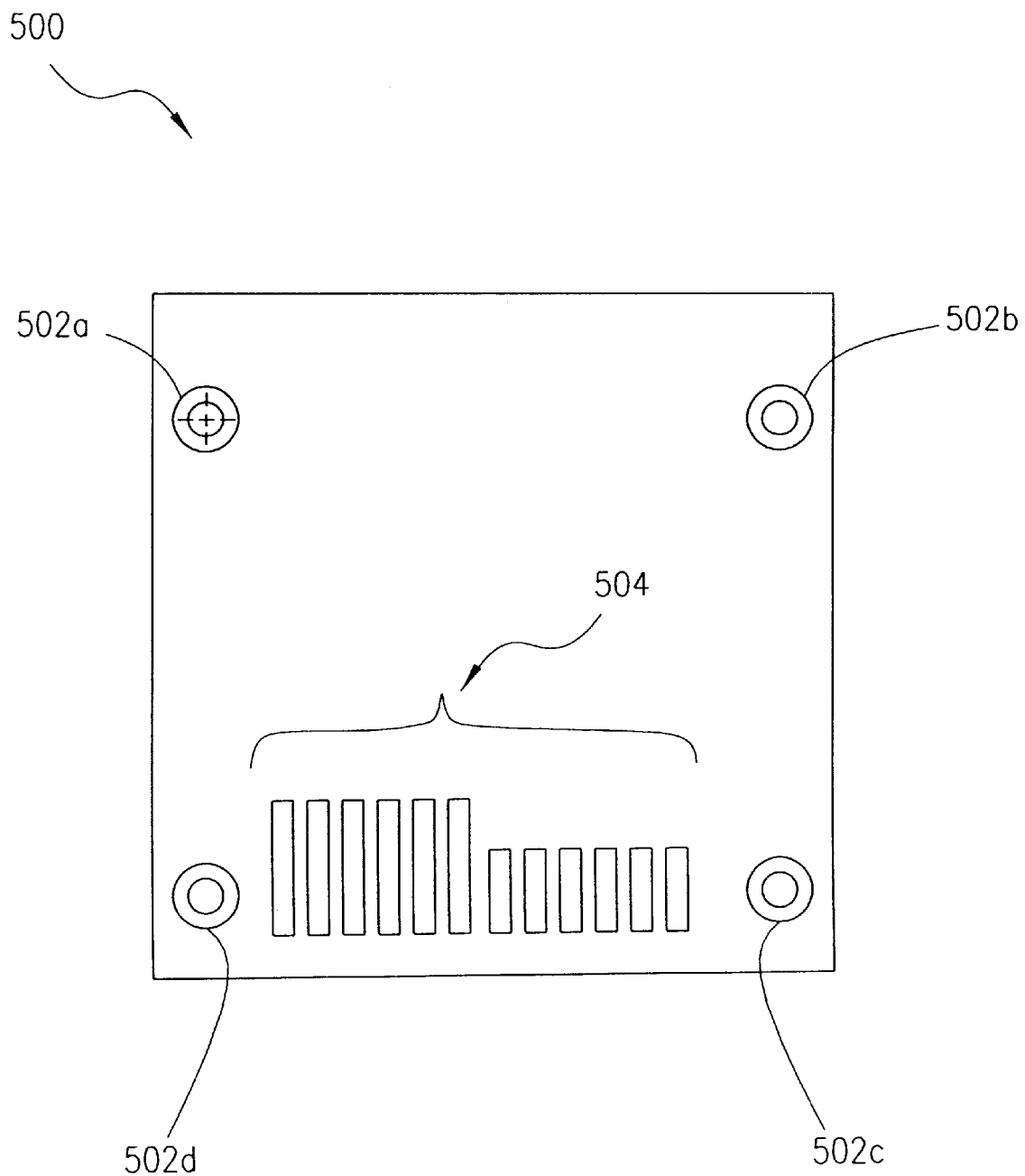
FIG. 5  (Interface Printed Circuit Board)

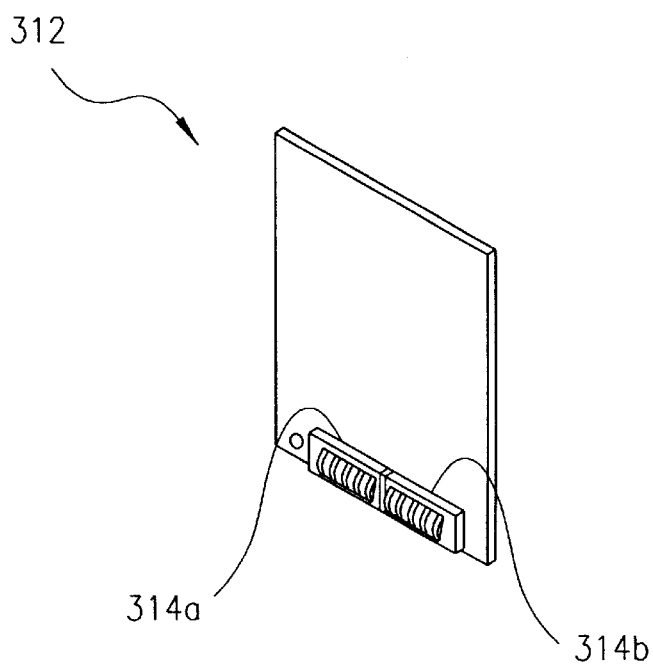
FIG. 6A (Rasterizer Printed Circuit Board)
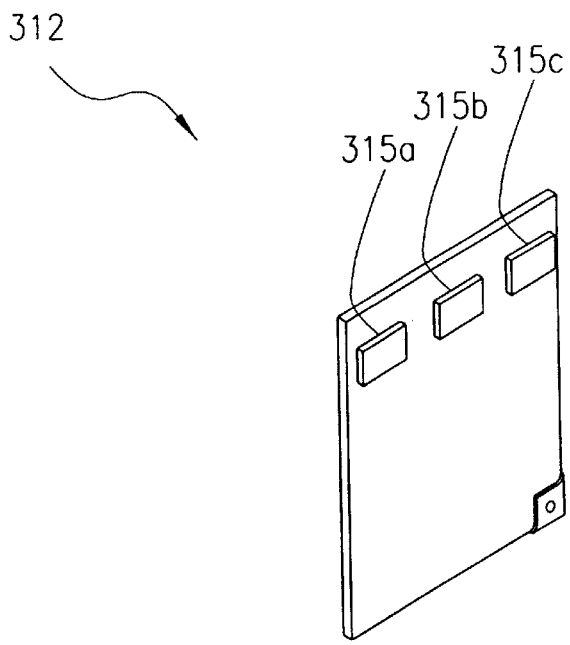
FIG. 6B

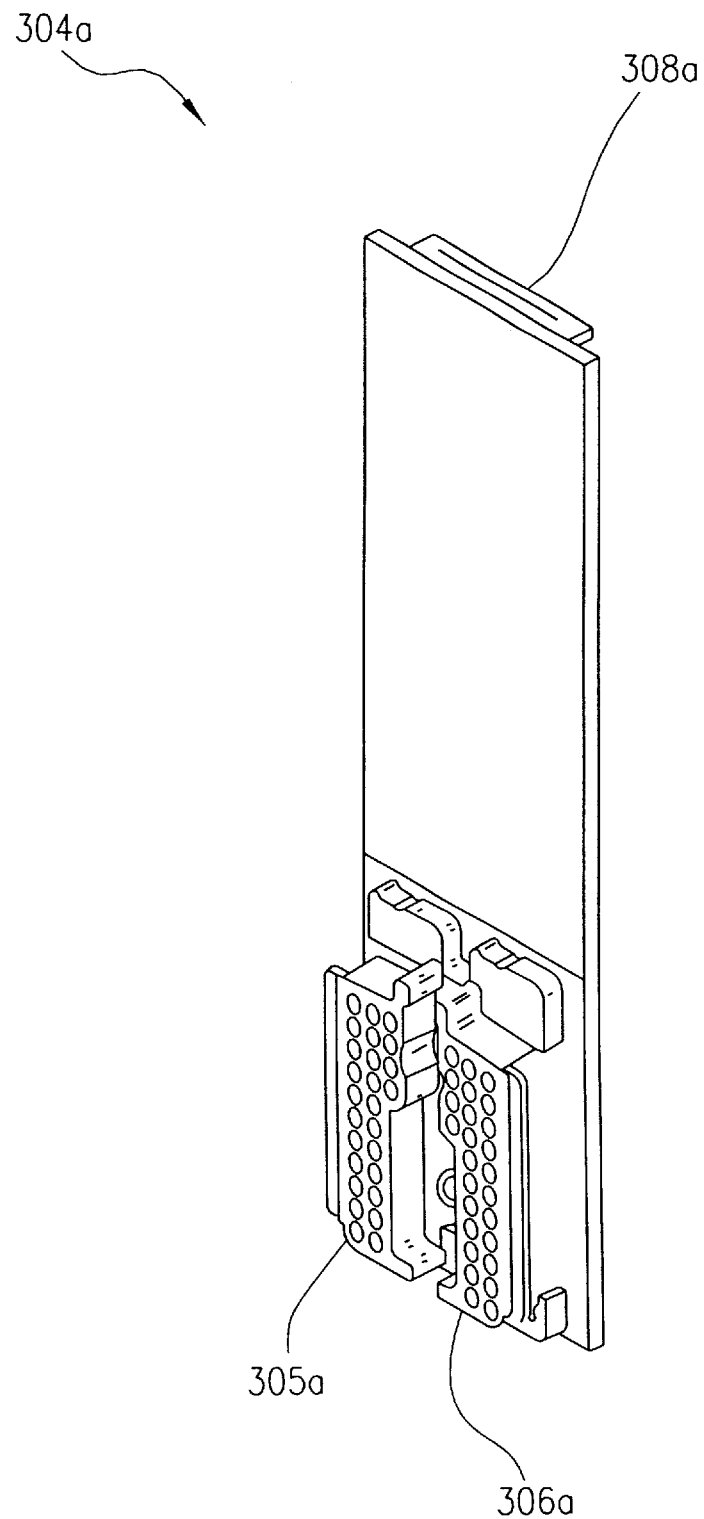
FIG. 7   (Pen Driver Printed Circuit Board)

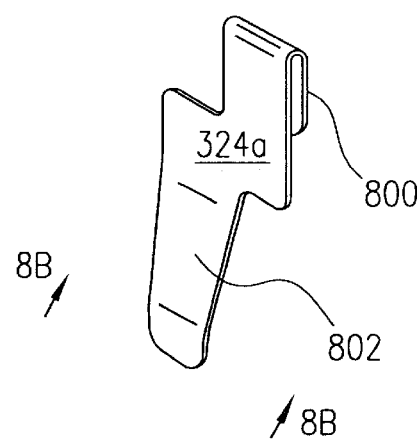
FIG. 8A (Side Pen Spring)
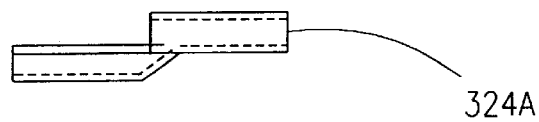
FIG. 8C
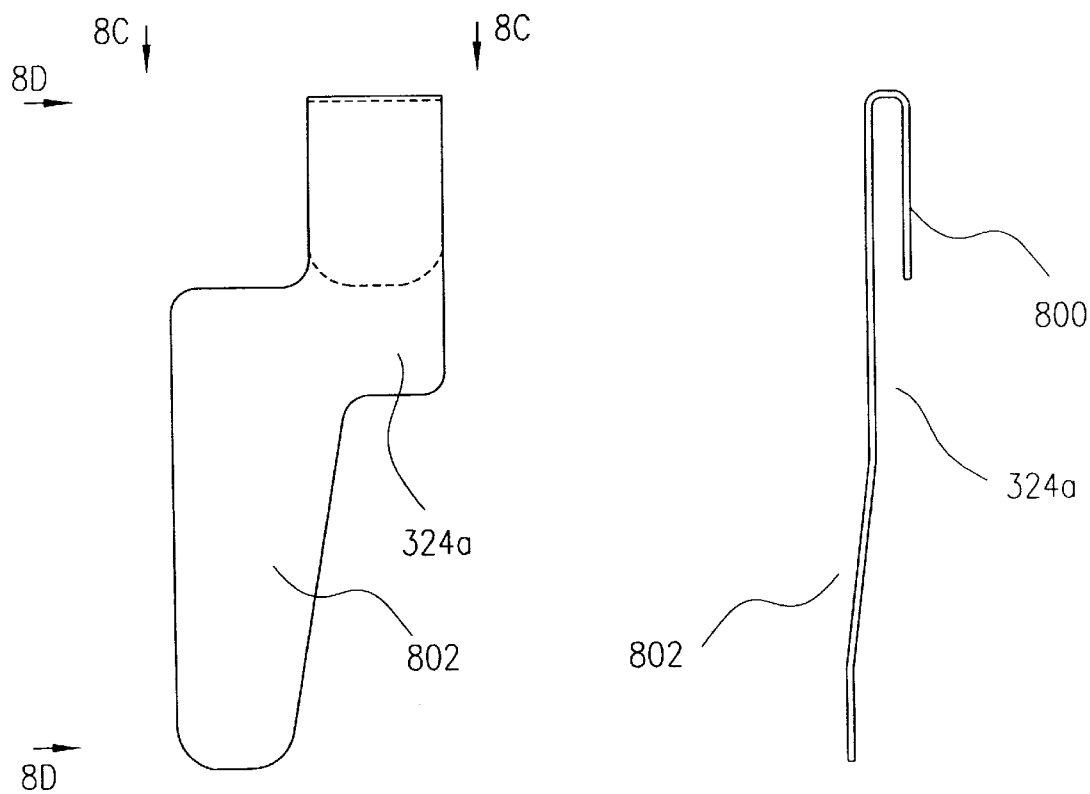
FIG. 8B            FIG. 8D

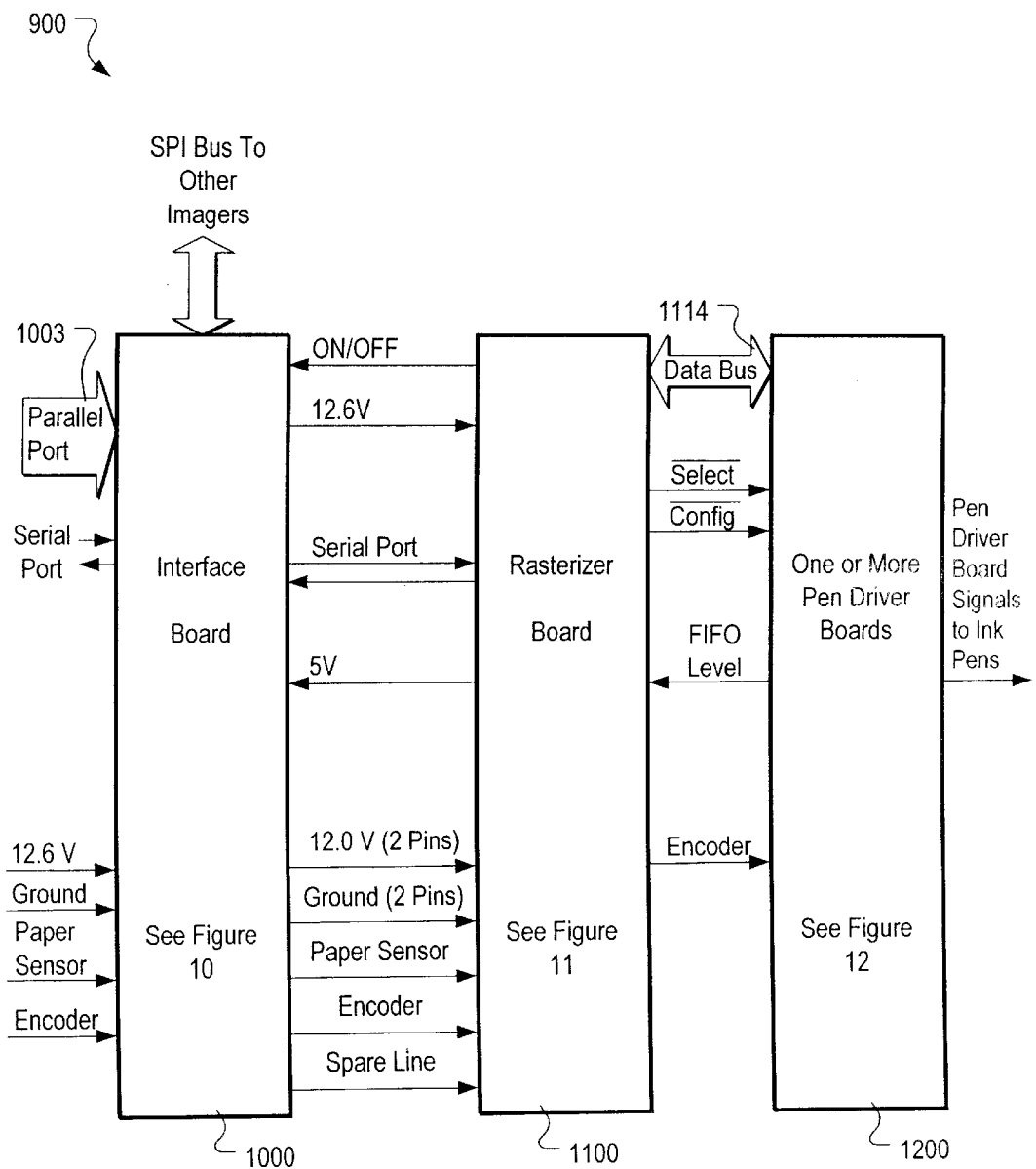
FIG. 9 (System Block Diagram)

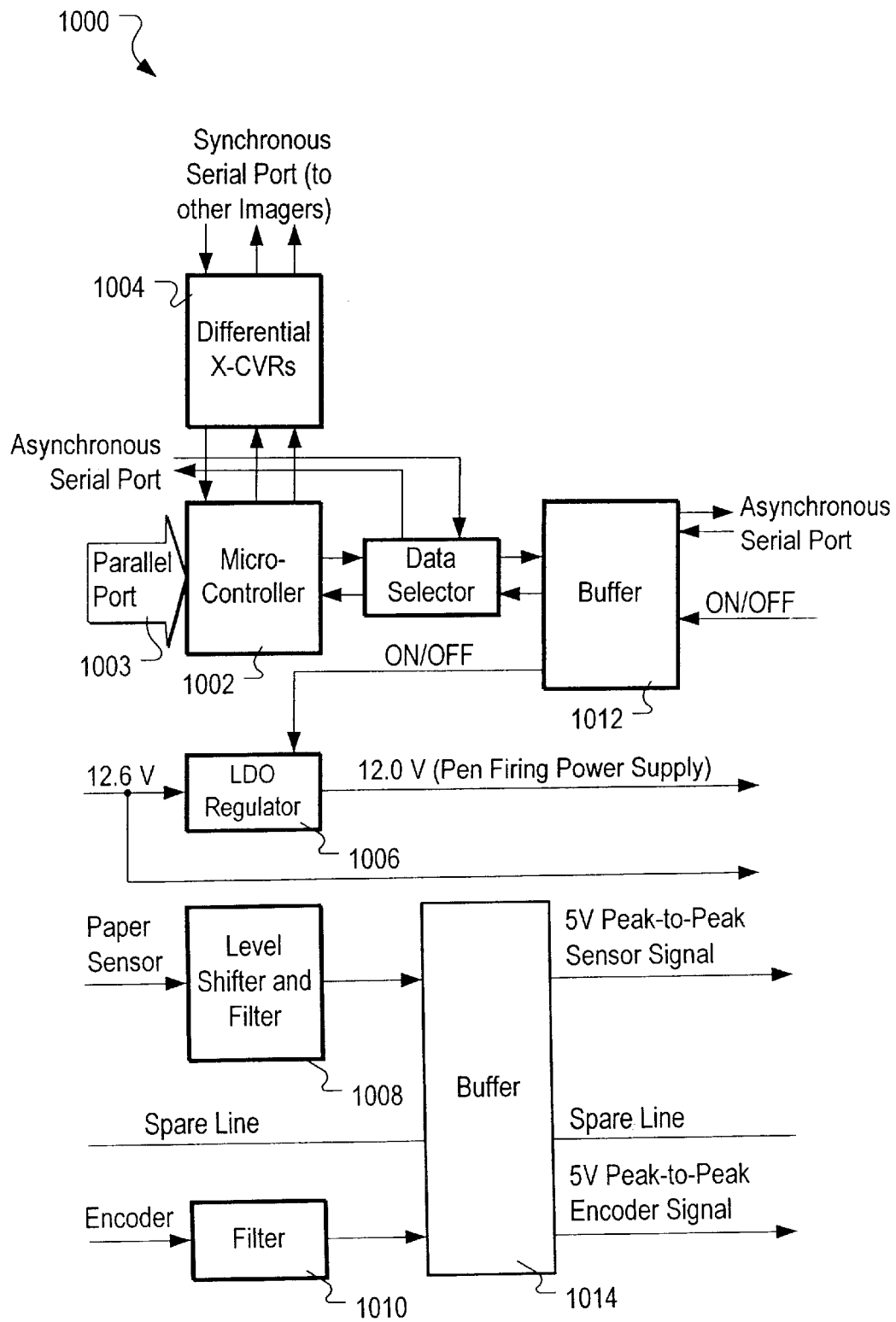
FIG. 10 (Interface Board)

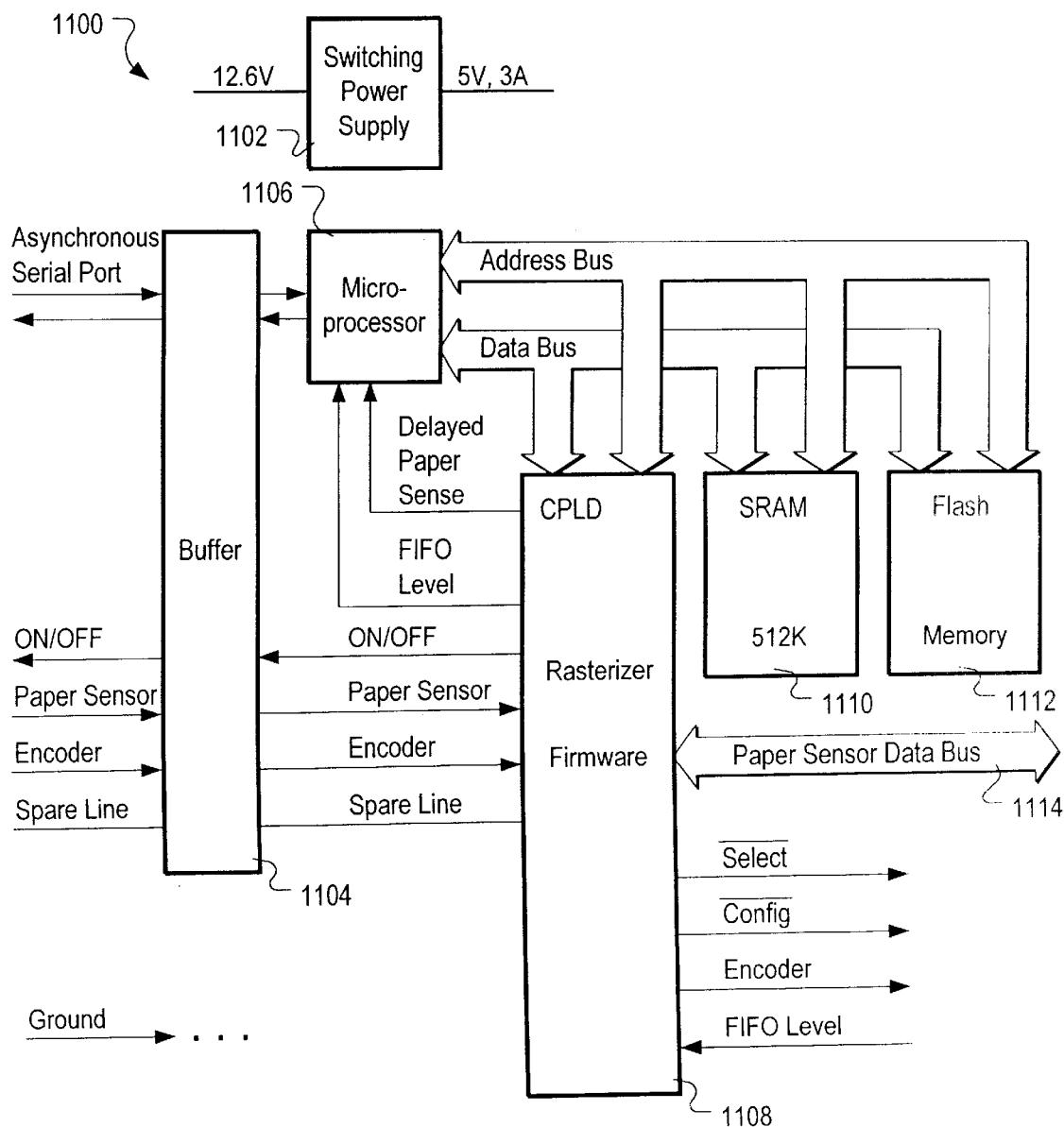
FIG. 11 (Rasterizer Board)

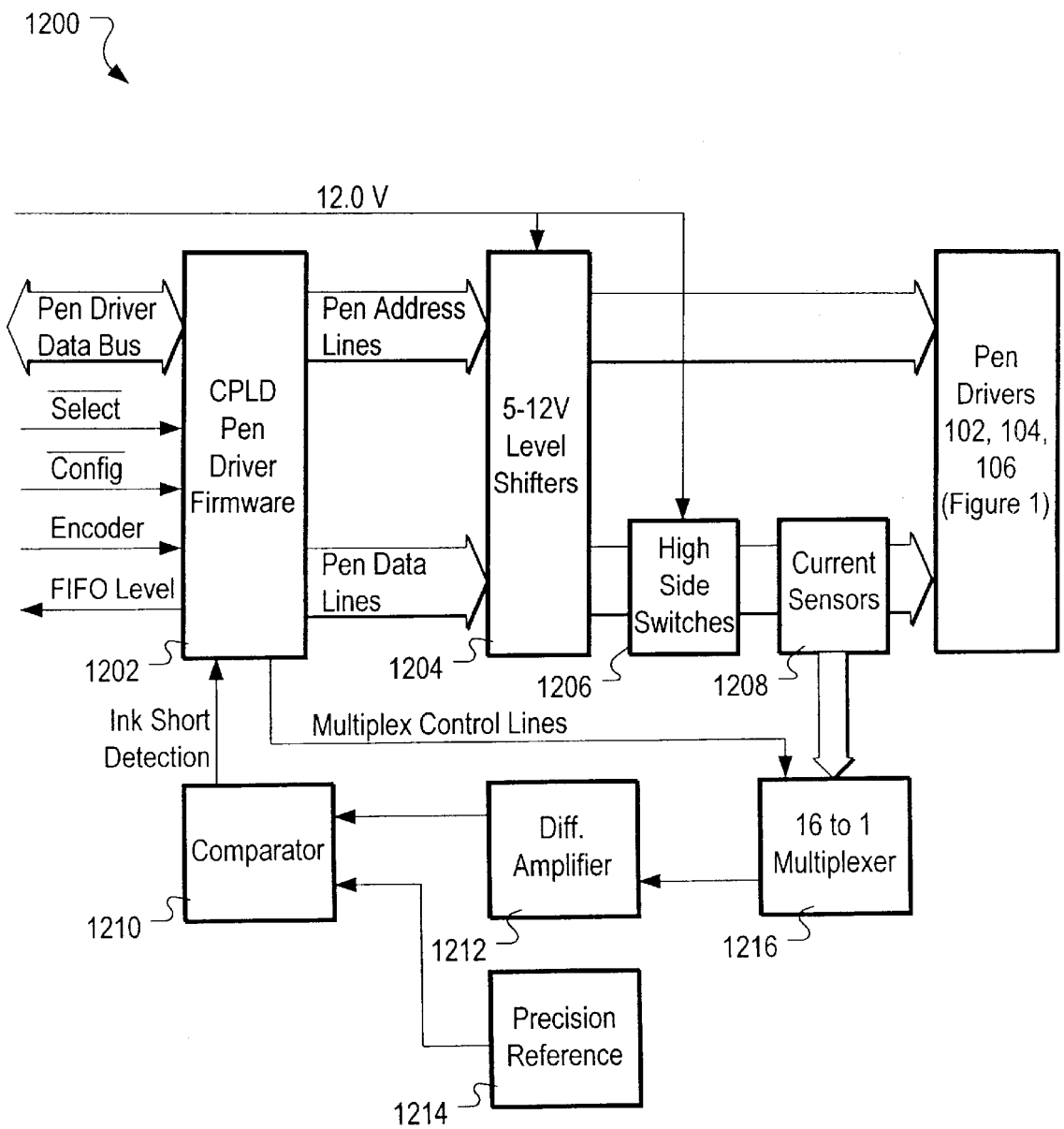
FIG. 12 (Pen Driver Board)

IMAGER FEATURING SERVICE STATION ASSEMBLY WITH INTERFACE BOARD AND CARTRIDGE ASSEMBLY WITH CUSTOMIZED RASTERIZER AND PEN DRIVER BOARDS

BACKGROUND OF THE INVENTION

1. Field of the Invention

The present invention relates to an apparatus for printing an image on a medium.

2. Description of the Related Art

A printing station is known in the art that receives an image signal on a serial interface containing information about an image having for example one or more ASCII characters to be printed on a given medium, that rasterizes the image signal to create a bitmap of the one or more ASCII characters with a rasterizer board, and that remaps a rasterized image signal with pen driver boards for printing the image with Hewlett Packard pens on the given medium. The printing station has a pen housing for housing the pen driver boards and the Hewlett Packard pens.

One disadvantage of the known printing station is that it does not have a number of standard interfaces, and did not daisy chain multiple imagers.

Another disadvantage of the known printing station is that the rasterizer board is remote from the pen housing and not arranged therein. This results in an electrical noise being introduced into the rasterized image signal transmitted along a cable connecting the rasterizer board to the pen driver boards. The rasterizer board cannot be arranged in the pen housing because it is configured from a standard off-the-shelf printed circuit board which results in an undesirably large printed circuit board (about 3.75 inches by 3.5 inches for over 13 square inches).

Still another disadvantage of the known printing station is that the rasterizer board has a microprocessor-based architecture for driving software that results in very slow data processing that is only fast enough to achieve image resolutions of about 300 dots per inch.

Still another disadvantage of the known printing station is that the pens are affixed with screws to the pen housing and not easily removed for replacement or cleaning. In a production printing environment, the printing station may be used to print addresses on envelopes where the pens may be used to print 200 or more images per minute (or 12,000 or more images per hour). In such an environment, the pens must be changed frequently and as quickly as possible to avoid unnecessary printing station down time, which results in less envelope being printed per minute.

Still another disadvantage of the known printing station is that the pen is affixed with screws to a pen housing of the printing station, and thus not easily removed for servicing the pen driver boards or changing the pens.

SUMMARY OF THE INVENTION

The present invention is designed to overcome the above disadvantages that are attendant upon the use of the "prior art" printing station.

The present invention provides an imager having a service station assembly with a customized interface board, and also having a cartridge assembly with a customized rasterizer board and one or more customized pen driver boards.

The customized interface board has a controller that responds to an image signal containing an image to be printed on a medium, the image signal having any one of a number of different standard interface, for providing an interface board image signal in a protocol suitable for the customized rasterizer board. The image signal may contain information in the form of ASCII text, bitmaps, logos, indicia, graphics, bar codes; etc. The medium may include paper, packages, textiles, labels, calenders, passports, etc.

The customized rasterizer board has a programmable logic device (i.e. firmware), responds to the interface board image signal, rasterizes the interface board image signal into a bitmap, and provides a customized rasterizer board image signal.

The one or more customized pen driver boards have a programmable logic device (i.e. firmware), respond to the customized rasterizer board image signal, remap the customized rasterizer board image signal, and provide a pen driver board signal to a corresponding one or more pens for printing the image on the medium.

The cartridge assembly has one or more cartridge channels for receiving the one or more pens, and one or more clamping assembles for pivotally engaging and detachably latching the one or more pens in the one or more cartridge channels.

The service station assembly has a vertical bracket with channels. The cartridge assembly has tongues for sliding into the channels for slidably mounting the cartridge assembly and the service station assembly.

One advantage of the present invention is that the customized interface board may include many different standard interfaces, including an RS232 interface, RS845 interface, a parallel printer port interface, USB interface, or ethernet interface, and daisy chains multiple imagers.

Another advantage of the present invention is that the customized rasterizer board is included in the cartridge assembly. This reduces the electrical noise from being introduced into the rasterized image signal transmitted from the customized rasterizer board to the customized pen driver board, which is a high frequency signal. The customized rasterizer board can be arranged in the pen housing because it is configured from a customized printed circuit board which uses a high density board having multiple layers (i.e. for example 6 or more different layers with tracers) that results in a much smaller compact printed circuit board (about 3.5 inches by 2.75 inches for less than 10 square inches). The high density board, multi-layered approach translates into a space savings in square inches of about 30%, which provides a highly modularized imager design that is much more readily adaptable for many different types of printing station applications including an ATM machine, a point of sale terminal, gas pumps, etc. Similarly, the pen driver board is configured on a customized printed circuit board which uses a high density board having multiple layers.

Still another advantage of the present invention is that the programmable logic device (i.e. firmware) in the customized rasterizer board is fast and able to process data fast enough to achieve image resolutions greater than 600 dots per inch, which is four times (4x) the image resolution of the prior art printing station (i.e. 300 dots per inch). Similarly, the customized pen driver board has a programmable logic device (i.e. firmware) that is fast and able to process data fast enough to achieve image resolutions greater than 600 dots per inch.

Still another advantage of the present invention is that the one or more pens are attached to the pen housing by a pivot latch and easily removed for replacement or cleaning. In a production printing environment, the pens can be quickly changed to avoid any unnecessary printing down time, which results in more envelopes being printed per minute on the average.

Still another advantage of the present invention is that the cartridge assembly is slidably mounted on the service station assembly, thus easily removed for servicing the cartridge assembly, changing the one or more pens, or cleaning the one or more pens by wiping. In a production printing environment, the one or more pens will have to be cleaned numerous times in the course of a day.

The invention will be fully understood when reference is made to the following detailed description taken in conjunction with the accompanying drawings.

BRIEF DESCRIPTION OF THE DRAWING

The drawing incudes the follows Figures:

FIG. 1A is a perspective view of an imager that is the subject matter of the present invention.

FIG. 1B is a top view of the imager shown in FIG. 1A.

FIG. 1C is a diagram of a cross-sectional view of the imager shown in FIG. 1B along lines 1C—1C.

FIG. 2A is an exploded view of one embodiment of a service station assembly of the imager shown in FIG. 1.

FIG. 2B is an exploded view of a capping station assembly for the imager shown in FIG. 1.

FIG. 3 is an exploded view of a cartridge assembly of the imager shown in FIG. 1.

FIG. 4A is a perspective front view of a three pen cartridge of the cartridge assembly shown in FIG. 3.

FIG. 4B is a perspective back view of a three pen cartridge of the cartridge assembly shown in FIG. 3.

FIG. 4C is a top view of the three pen cartridge shown in FIGS. 4A and 4B.

FIG. 4D is a front view along lines 4D—4D of the three pen cartridge shown in FIG. 4A.

FIG. 4E is a back view along lines 4E—4E of the three pen cartridge shown in FIG. 4B.

FIG. 4F is a section view along lines 4F—4F of the three pen cartridge shown in FIG. 4E.

FIG. 4G is an expanded view of a portion of the cartridge assembly labelled A in FIG. 4F.

FIG. 5 is a diagram of a customized interface printed circuit board for adapting to the service station assembly shown in FIG. 2A.

FIG. 6A is a diagram of a front view of a customized rasterizer printed circuit board assembly for the cartridge assembly shown in FIG. 3.

FIG. 6B is a diagram of a back view of a customized rasterizer printed circuit board assembly shown in FIG. 6A.

FIG. 7 is a perspective view of a customized pen driver printed circuit board assembly for the cartridge assembly shown in FIG. 3.

FIG. 8A is a perspective view of a pen side spring for the cartridge assembly shown in FIG. 3.

FIG. 8B is a front view along lines 8B—8B of the pen side spring shown in FIG. 8A.

FIG. 8C is a top view along lines 8C—8C of the pen side spring shown in FIG. 8B.

FIG. 8D is a side view along lines 8D—8D of the pen side spring shown in FIG. 8B.

FIG. 9 is a block diagram of an electronics system for the imager shown in FIG. 1.

FIG. 10 is a block diagram of a customized interface board of in the electronic system shown in FIG. 9.

FIG. 11 is a block diagram of a customized rasterizer board of the electronic system shown in FIG. 9.

FIG. 12 is a block diagram of a customized pen driver board of the electronic system shown in FIG. 9.

DETAILED DESCRIPTION OF THE INVENTION

The Imager 100

Figure 13:
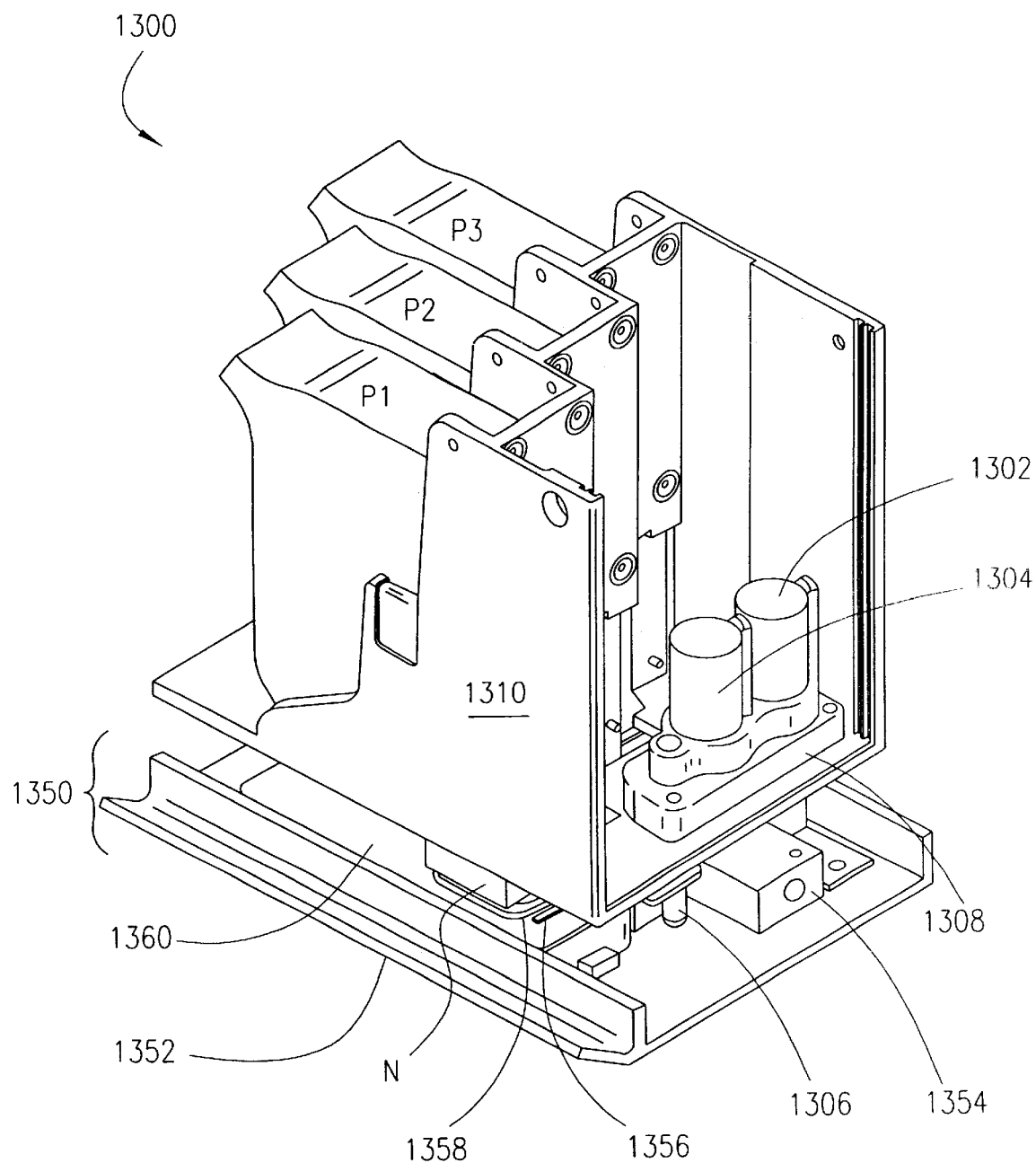
FIG. 13 is a perspective view of another embodiment of the imager that is the subject matter of the present invention.

FIG. 1A shows an imager generally indicated as 100, having of a service station assembly generally indicated as 200 and a cartridge assembly generally indicated as 300.

The cartridge assembly 300 is adapted for receiving one or more ink jet pens 102, 104, 106 (hereinafter referred to as "pens" 102, 104, 106) for printing an image on a medium (not shown), e.g. a sheet of paper or an envelope, passing underneath the service station assembly 200, such as a mailing address or other indicia on an envelope. The one or more pens 102, 104, 106 are known in the art and may be model no. HP 51645A made Hewlett Packard. In operation, the imager 100 is a part of a printing device or station (not shown), receives an image signal containing information about the image to be printed on the medium (not shown), processes the image signal, and provides pen signals to drive the one or more pens 102, 104, 106. The image signal typically comes from a personal computer (not shown), work station (not shown), network (not shown), or other suitable hardware (not shown) that is used to control the printing device or station (not shown). The scope of the invention is not intended to be limited to any particular means for providing the image signal to the imager, or the printing device or station (not shown) in which the imager 100 is used, or the type of one or more pens 102, 104, 106. Embodiments are envisioned in which the print station or device (not shown) uses the imager 100 for printing addresses on envelopes or postage information such as the mailing address or a two dimensional bar code. The imager 100 may also be used in an ATM machine (not shown), a point of sale terminal (not shown), etc. The present invention provides a highly modularized imager 100 for printing high resolution images having 600 or more dots per inch. The highly modularized imager 100 may also be used for printing much lower resolution images having less than 600 or more dots per inch. See also FIGS. 1B and 1C.

The Service Station Assembly 200

FIG. 2A shows the service station assembly 200 in more detail that is used to mount the imager 100 on the printing station or device (not shown). The service station assembly 200 includes a service station housing 202 with a service station housing opening 202a, a base mounting bracket 204 with a base mounting bracket opening 204a, a paper guide ski 206 with a paper guide ski opening 206a and a vertical bracket 208. The vertical bracket 208 has channels 210a, 210b for slidably mounting the cartridge assembly 300 (FIGS. 1A–1C) on the service station housing 202 in a manner discussed below. The base mounting bracket 204 is connected by screws (not shown) to the vertical bracket 208 to form an L-shaped tray. The service station housing 202 is connected by screws (not shown) to the base mounting bracket 204. In operation, the medium (not shown) on which the image is to be printed passes underneath the paper guide ski 206. The vertical bracket 208 has a backside 208a for receiving an interface printed circuit board 500 described below with respect to FIGS. 5, 9 and 10. The service station housing opening 202a, the base mounting bracket opening 204a, and the paper guide ski opening 206a are aligned in registration for allowing respective nozzles 102a (FIG. 1C) of the one or pens 102, 104, 106 (FIGS. 1A–1C) to provide ink through to print the image on the medium (not shown).

The Capping Station Assembly 250

FIG. 2B shows a capping station assembly 250 that includes a capping station housing 252, a capping station baseplate 254 and one or more capping seals 256a, 256b, 256c for sealing the one or more pens 102, 104, 106 (FIGS. 1A–1C). In operation the cartridge assembly 300 is slidably removed from the service station assembly 200 and placed on the capping station assembly 250 for sealing the one or more pens 102, 104, 106 (FIGS. 1A–1C). The capping station housing 252 has pegs 252a, 252b for cooperating with apertures 417a, 417b (FIG. 4C), discussed below, for aligning the cartridge assembly 300 on the capping station housing 252.

The Cartridge Assembly 300

FIG. 3 shows the cartridge assembly 300 in greater detail. As shown, the cartridge assembly 300 includes a three pen imager cartridge 302; three customized pen driver printed circuit boards 304a, 304b, 304c; three pen connector housings 306a, 306b, 306c; ribbon connectors 308a, 308b, 308c; a rasterizer printed circuit board cover 310; a customized rasterizer printed circuit board 312; Bournes connectors 314a, 314b; three ribbon cables 316a, 316b, 316c; three pen channels 318a, 318b, 318c; three dowel apertures 320a, 320b, 320c; three clamp assembles (i.e. latches) 322a, 322b, 322c; three side pen springs 324a, 324b, 324c; three dowel pins 326a, 326b, 326c; flat head cap screws 328; a lower clamp 330; an upper clamp 332, heat sinks 334a, 334b and tongues 336a, 336b.

The three pen channels 318a, 318b, 318c are suitably adapted for receiving the pens 102, 104, 106 (FIGS. 1A–1C). The three pen connector housings 306a, 306b, 306c have respective resilient, retractable channel contacts 305a (see FIG. 7 for more detail) in the three pen channels 318a, 318b, 318c for providing pen signals to the one or pens 102, 104, 106 (FIGS. 1A–1C). As best shown in FIG. 1C, the latch 322a has a protruding piece 322a' that cooperates with a recessed portion generally indicated as 102c of the pen 102. In operation, the latches 322a, 322b, 322c pivotally engage the pens 102, 104, 106 (FIGS. 1A–1C) in the three pen channels 318a, 318b, 318c so that the three pen connector housing 306a, 306b, 306c are in electrical contact with pen contacts of the pens 102, 104, 106 (FIGS. 1A–1C) for communicating the pen signals. As shown, the latches 322a, 322b, 322c are mounted on the three dowel pins 326a, 326b, 326c arranged in the three dowel apertures 320a, 320b, 320c. The tongues 336a, 336b cooperate with the channels 210a, 210b (FIG. 2A) of the vertical bracket 208 (FIG. 2A) for slidably mounting the cartridge assembly 300 (see also FIGS. 1A–1C) on the vertical bracket 208 (FIG. 2A).

The Three Pen Image Cartridge 302

FIGS. 4A–4G show the three pen image cartridge 302 in more detail. The three pen image cartridge 302 is a plastic injection molded modular unit, which can be mass-produced at a cost of a couple of dollars per unit. The three pen image cartridge 302 has a rear chamber generally indicated as 406 (see FIGS. 4B, 4C, 4E, 4F); rear chamber back walls 410a, 410b, 410c (see FIGS. 4B, 4C, 4E, 4F); channel backwalls 411a, 411b, 411c with channel backwall openings 412a, 412b, 412c (see FIGS. 4B, 4D, 4E); rasterizer printed circuit board channels 414a, 414b (see FIGS. 4C, 4F, 4G); cover channels 416a, 416b (see FIGS. 4C, 4F, 4G); channel openings 418a, 418b, 418c; and channel ledges 420a, 420b, 420c.

The rear chamber 406 houses the three pen driver printed circuit boards 304a, 304b, 304c (FIG. 3) and the customized rasterizer printed circuit board 312 (FIG. 3). The three customized pen driver printed circuit boards 304a, 304b, 304 are mounted on the rear chamber back walls 410a, 410b, 410c. The channel backwall openings 412a, 412b, 412c expose the three pen connector housings 306a, 306b, 306c to the three pen channels 318a, 318b, 318c for coupling to the pen contacts of the pens 102, 104, 106 (FIGS. 1A–1C). The customized rasterizer printed circuit board 312 (FIG. 3) is slidably arranged in the rasterizer printed circuit board channels 414a, 414b in a certain position relative to the customized interface board (FIG. 5) mounted on the vertical bracket 208 (FIGS. 1 and 2A) in a manner discussed below. The rasterizer board cover 310 (FIGS. 1 and 3) is slidably arranged in the cover channels 416a, 416b. The channel openings 418a, 418b, 418c are for exposing the respective nozzles such as 102a (FIG. 1C) of the one or more pens 102, 104, 106 (FIGS. 1A–1C) to the service station assembly 200 arranged underneath. The channel ledges 420a, 420b, 420c provide a mounting surface 102b (see FIG. 1C) for the pens 102, 104, 106 (FIGS. 1A–1C) arranged in the three pen channels 318a, 318b, 318c (FIG. 3).

As shown, the three pen image cartridge 302 has a height (H) of about 3.5 inches, a front-to-back length (L) of about 3.5 inches and a side-to-side width of about 3.0 inches.

The Interface Printed Circuit Board 500

FIG. 5 shows features of the customized interface printed circuit board which is generally indicated as 500 related to mounting to the vertical bracket 208 (FIG. 2A) and making electrical contact with the customized rasterizer board 312 (FIG. 3). As shown, the customized interface printed circuit board 500 has no printed circuitry or semiconductor devices per se, which are discussed in detail below with respect to FIGS. 9 and 10. FIG. 5 is provided to show and describe the unique electromechanical relationship between the customized interface printed circuit board 500 and the customized rasterizer board 312 (FIG. 3).

As shown, the customized interface printed circuit board 500 has mounting openings 502a, 502b, 502c, 502d for mounting on the backside 208a (FIG. 2A) of the vertical bracket 208 (FIG. 2A), and has an interface printed circuit board connector 504 for providing interface printed circuit board control and data signals to the customized rasterizer board 312 (FIG. 3), as discussed below. As shown and discussed in more detail below, the interface printed circuit board control and data signals include 12 connectors, which correspond to the 12 pins between the interface and rasterizer board in FIG. 9, including a spare pin, 2 pins for 12 volts, and 2 pins for ground. The interface printed circuit board 500 also has a multipin connector (not shown) for receiving the image signals and other control signals from a personal computer (not shown), work station (not shown), network (not shown), or other suitable hardware (not shown) or other device in the outside world. The overall function of the interface printed circuit board 500 is described in detail below with respect to FIGS. 9–10.

The Customized Rasterizer Printed Circuit Board 312

FIGS. 6A and 6B show features of the customized rasterizer printed circuit board 312 related to making electrical contact with the customized interface board 500 (FIG. 5) and the pen driver board 304a, 304b, 304c; 700 (FIGS. 3 and 7). Similar to that discussed above with respect to FIG. 5, as shown, the customized rasterizer printed circuit board 312 has no printed circuitry or semiconductor devices per se, which are discussed in detail below with respect to FIGS. 9 and 11. FIGS. 6A and 6B are provided to show and describe the unique electromechanical relationship between the customized interface printed circuit board 500 and the customized rasterizer board 312 (FIG. 3).

The customized rasterizer printed circuit board 312 has Bournes connectors 314a, 314b for slidably coupling to the interface printed circuit board connector 504 (FIG. 5) for receiving the interface printed circuit board data and control signals from the interface printed circuit board 500 (FIG. 5). The Bournes connectors 314a, 314b are resilient, retractable contacts that push in when coming in contact with the interface printed circuit board connector 504 (FIG. 5). The customized rasterizer printed circuit board 312 also has multipin connectors 315a, 315b, 315c for providing customized rasterizer image data signals to the ribbon connectors 308a, 308b, 308c (FIG. 3) of the pen driver board 1200 (FIGS. 3, 9 and 12), as discussed below. The overall function of the interface printed circuit board 500 is described in detail below with respect to FIGS. 9–11.

The Side Pen Spring 324

FIGS. 8A, 8B, 8C, 8D show the side pen spring 324a (see FIG. 3), having a hooked portion 800 for mounting over a wall of the three pen imager cartridge 302 (FIG. 3), and has a flared out portion 802 best shown in FIG. 8D for providing elastic force on the pen 102 when mounted in the channel 318a (FIG. 3) of the three pen imager cartridge 302 (FIG. 3).

Imager Electronics

FIG. 9 shows a system block diagram of imager electronics generally indicated as 900. The imager electronics 900 include a customized interface board 1000 shown and described with respect to FIG. 10, a customized rasterizer board 1100 shown and described with respect to FIG. 11, and one or more pen driver boards 1200 shown and described with respect to FIG. 12. FIG. 9 is best understood when reviewed in conjunction with the detailed description below of FIGS. 10–12.

Interface Board 1000

FIG. 10 shows the customized interface board 1000 in greater detail, which is typically a printed circuit board (see FIG. 5). The customized interface board 1000 receives image data signals that contain image information (for example image information in the form of ASCII text, bitmaps, logos, indicia, graphics, bar codes, etc.) about an image to be printed by the imager 100 (FIGS. 1A–1C) and other control signals from a personal computer (not shown), work station (not shown), network (not shown), or other suitable hardware (not shown) or other device (not shown) in the outside world, and adapts these signals to a protocol suitable to the customized rasterizer board 1100 (FIGS. 9 and 11). The protocol relates to the format of the imaging data to be sent to the customized rasterizer board 1100 (FIG. 9). In operation, the interface board 1000 handles all connections between the imager 100 (FIGS. 1A–1C) and the outside world, including other imagers (not shown). As shown, the interface board 1000 includes a microcontroller 1002, a differential transceiver 1004, a data selector 1005, a LDO regulator 1006, a level shifter and filter 1008, a filter 1010, a first buffer 1012 and a second buffer 1014.

The microcontroller 1002 has a parallel port 1003 for receiving the image data signals as parallel data image signals from the outside world, processes these signals, and provides them to the buffer 1012 in the form of serial data image signals. The buffer 1012 responds to the serial image data signals, buffers these signals, and provides serial interface board image data signals on a serial port. The buffer 1012 and the microcontroller 1002 also cooperate to provide serial rasterizer board signals from the customized rasterizer board 1100 (FIG. 9) to the outside world, including other imagers (not shown).

The data selector 1005 provides asynchronous serial port signals to and from the outside world and the imager 100 (FIGS. 1A–1C). In operation, the data selector 1005 provides the asynchronous serial port signals from the outside world to the buffer 1012, and the data selector 1005 provides the asynchronous serial port signals from the rasterizer board 1100 (FIG. 10) via the buffer 1012, as discussed below, to the outside world.

The interface board 1000 receives control signals that include among others a 12.6 volt signal, a ground signal, a paper sensor signal, an encoder signal, and an ON/OFF control signal from the customized rasterizer board 1100.

The low drop out (LDO) regulator 1006 responds to the 12.6 voltage signal and the ON/OFF control signal, converts the 12.6 voltage signal into a 12.0 volt signal, and provides the 12.0 volt signal to the customized rasterizer board 1100 as a pen firing power supply signal.

The level shifter and filter 1008 responds to the paper sensor signal, and provides a filtered five volt peak-to-peak paper sensor signal. The paper sensor signal contains information about whether a certain media is in a position to print the image. The paper sensor signal is provided from the outside world and may come from for example an electromechanical sensor that senses an envelope in a position for receiving a image provided from the imager 100 (FIGS. 1A–1C).

The filter 1010 responds to the encoder signal, filters it, and provides a five volt peak-to-peak encoder signal. The encoder signal provides information about how fast the medium is moving in the printing station or device (not shown).

The buffer 1014 responds to the five volt peak-to-peak paper sensor signal and the five volt peak-to-peak encoder signal, buffers these signals, and provides a buffered five volt peak-to-peak paper sensor signal and a buffered five volt peak-to-peak encoder signal to the customized rasterizer board 1100.

The differential transceiver 1004 allows the imager 100 (FIGS. 1A–1C) to communicate with other imagers (not shown) via an asynchronous serial port. For example, the differential transceiver 1004 can respond to asynchronous serial other imager information signals, convert single-ended synchronous serial signals into corresponding differential signals that are more immune to noise, so that information can be reliably transmitted between imagers, and provides differentiated asynchronous serial other imager information signals to the microcontroller 1002. In operation, two interface boards may be connected via a differential synchronous serial port and exchange information such as ASCII text, bitmaps, fonts, or control information. By connecting two interface boards together in this manner, a single personal computer or other outside world device can communicate with and control multiple imagers through a single parallel port. This is accomplished by having the microcontroller 1002 relay the necessary information between the parallel port and the differential transceivers 1004.

In operation, the interface board 1000 is customized to provide at least the following different standard interfaces: an RS232 interface, an RS845 interface, a parallel printer port interface, a universal serial bus (USB) interface.

The interface board 1000 may be a high density board having multiple tracing layers for providing a highly modularized imager design.

It is noted that the ground in FIG. 9 is connected to all the circuit elements in FIG. 10.

The Customized Rasterizer Board 1100

FIG. 11 shows the customized rasterizer board 1100 in greater detail, which is typically a printed circuit board (see also FIGS. 3, 6 and 9). The customized rasterizer board 1100 receives the serial interface board image data signals from the interface board 1000 (FIGS. 9 and 10), builds a customized rasterizer image by converting the image information into a bitmap to be printed, and sends customized rasterizer image data signals to the pen driver board 1200 (FIGS. 9 and 12). As shown, the customized rasterizer board 1100 includes a switching power supply 1102, a buffer 1104, a microprocessor 1106, a customized programmable logic device (CPLD) 1108, a SRAM 1110 and a flash memory 1112.

The rasterizer buffer 1104 responds to the serial interface board image data signals, buffers these signals, and provides serial interface board image data signals to the microprocessor 1106. The rasterizer buffer 1104 provides the ON/OFF control signal and other asynchronous information signals back to the interface board 1000 (FIGS. 9 and 10), and also provides the five volt peak-to-peak paper sensor signal and the five volt peak-to-peak encoder signal from the interface board (FIGS. 9 and 10) to the customized programmable logic device (CPLD) 1108.

The customized programmable logic device (CPLD) 1108 responds to a FIFO level control signal from the pen driver board 1200 (FIGS. 9 and 12), also responds to the five volt peak-to-peak paper sensor signal and the five volt peak-to-peak encoder signal, and provides the delayed paper sense control signal and the FIFO level control signal to the microprocessor 1106. The microprocessor 1106, the customized programmable logic device (CPLD) 1108, the SRAM 1110 and the flash memory 1112 all cooperate at a high speed to build the customized rasterizer image by converting the image information into the bitmap to be printed, for providing the customized rasterizer image data signals on the pen driver data bus 1114 to the pen driver board 1200. The customized programmable logic device (CPLD) 1108 is a high speed circuit that allows the rasterizer board to convert the image information into a bitmap about a 1000 times faster than the rasterizer board in the prior art printing station. The conversion of an image information into a bitmap to be printed is known in the art, and the scope of the invention is not intended to be limited to any particular method thereof. The conversion of the image information into a bitmap to be printed includes: dividing the data into thirds, one part for each pen 102, 104, 106 (FIGS. 1A–1C), staggering the data since the pens 102, 104, 106 (FIGS. 1A–1C) are offset with respect to one another, as well as mapping the data into the bitmap conforming to the image to be printed on the medium (not shown).

In operation, the delayed paper sense signal is generated by the (CPLD) 1108 from the encoder and paper sense signals. Using the encoder signal to measure the rate of movement of material under the imager, the CPLD delays the paper sense signal by a programmable amount in order to create a specific "margin" between the edge of the material to be printed on and the start of the printed image. Using the CPLD to create this delayed paper sense signal, and the providing this delayed paper sense signal to the microprocessor 1106, alleviates the need for the microprocessor to keep track of the movement of the material to be printed on. This simplifies the design of the software and further enhances the speed at which the imager can process and print images.

The CPLD also performs some "de-bouncing" on the encoder and paper sense signals, and provides the de-bounced encoder signal to the pen-driver boards. This prevents double and false triggers on the paper sense and encoder signal.

The Fifo level signal is generated by one of the pen driver boards 1200, and is relayed to the microprocessor 1106 via the CPLD 1108. During printing, the pen-driver boards use the encoder signal to govern the rate at which they fire the HP pens. The Fifo level signal provides feedback from the pen driver boards 1200 to the microprocessor 1106 such that the microprocessor 1106 and CPLD 1108 provide image data to the pen driver boards at the rate necessary to print the image on the material moving under the imager.

The customized programmable logic device (CPLD) 1108 provides rasterized bitmap image signals on a pen driver data bus 1114 to the pen driver board 1200 (FIGS. 9 and 12), along with a select control signal, a configure control signal and the encoder signal.

The selected control signal function as follows: There are three separate pen-driver boards 1200 in each imager. The CPLD 1108 generates three separate select signals, one for each pen driver board 1200. Since each pen must be able to print different image data, each pen driver board 1200, must be individually selectable so that image data can be sent separately to each of the three pen driver boards. These signals are used by the CPLD 1108 to enable the appropriate pen driver board for an image data transfer.

The selected control signal functions as follows: There are three separate pen-driver boards 1200 in each imager. The CPLD 1108 generates three separate select signals, one for each pen driver board 1200. Since each pen must be able to print different image data, each pen driver board 1200, must be individually selectable so that image data can be sent separately to each of the three pen driver boards. These signals are used by the CPLD 1108 to enable the appropriate pen driver board for an image data transfer.

The customized programmable logic device (CPLD) 1108 provides the ON/OFF control signal. The ON/OFF control signal functions as follows: During power-up, the pen driver boards 1200, and rasterizer CPLD 1108, must be initialized before the imager can begin printing. Further, if the 12.0 volt signal to the pen driver boards 1200 is on before the pen driver boards are properly initialized, the pen driver boards may be damaged, and the HP ink jet pens may print undesirably and may also be damaged.

On power-up, the microprocessor 1106 initializes the rasterizer CPLD and the pen driver boards 1200. After this step has completed successfully, the microprocessor configures the rasterizer CPLD to turn on the 12.0 volt power supply to the pen driver boards using the ON/OFF signal.

The switching power supply 1102 responds to a 12.6 voltage signal, switches it to a five volt, three ampere signal, and provides a supply voltage signal. (Nb: it is not clear where this 12.6 volt signal is coming from. Compare your handwritten block diagram of the hardware overview, interface board, etc.

In one embodiment, the flash memory 1112 includes a direct memory access. The customized rasterizer board 312 may also be a high density board having multiple tracing layers for providing a modularized imager design. The customized programmable logic device (CPLD) 1108 formats data for the one or more pen driver boards 1200 (FIG. 9), and provides a data pathway between the microprocessor 1106 and the one or more pen driver boards 1200 (FIG. 9). Embodiments are also envisioned in which the customized programmable logic device (CPLD) 1108 is also used as a high speed device for quickly processing the imaging data, and converting it into a bitmap. The customized programmable logic device (CPLD) 1108 is specifically design to process information 1000 times faster than if a microprocessor-based architecture were used. Embodiments are also envisioned wherein the customized programmable logic device (CPLD) 1108 may also include either a programmable logic array (PLA), a programmable array logic (PAL), a field-programmable gate array (FPGA), a programmable logic device (PLD), or a combination thereof, to provide similar processing speeds.

It is also noted that the ground in FIG. 9 is connected to all the circuit elements in FIG. 11, and that, although not shown in FIG. 11, the 12 volt pen firing power supply signal is passed through the customized programmable logic device (CPLD) 1108.

Customized Pen Driver Board 1200

FIG. 12 shows one of the one or more customized pen driver boards 1200 in greater detail, which is typically a printed circuit board (see also FIGS. 3, 7 and 9). The pen driver board 1200 corresponds to the pen driver printed circuit boards 304a, 304b, 304c in FIG. 3. Each pen driver board 1200 receives the customized rasterizer image data signals from the customized rasterizer board 1100 (FIGS. 9 and 11), remaps and performs other graphic functions on these signals, and provides pen driver board data signals to drive a respective one of pens 102, 104, 106 (FIGS. 1A–1C) inserted in the imager 100 (FIGS. 1A–1C). As shown, each pen driver board 1200 includes a customized pen driver firmware 1202, 5–12 voltage level shifters 1204, a high side switch 1206, current sensors 1208, a comparator 1210, a differential amplifier 1212, a precision reference 1214, and a multiplexer 1216. As a person skilled in the art would appreciate, the pens 102, 104, 106 (FIGS. 1A–1C) do not receive a respective image data signal for each nozzle such as 102a (FIG. 1C) to be fired to print a dot. Instead, in order to fire a respective nozzle 102a (FIG. 1C), the pen driver board 1200 must provide a respective row and column that corresponds to a particular nozzle per dot.

The customized pen driver firmware 1202 responds to the customized rasterizer image data signals from the customized rasterizer board 1100 (FIGS. 9 and 11), responds to the select control signal, the configure control signal and encoder control signal from the customized rasterizer board 1100 (FIGS. 9 and 11), as well as a comparator control signal from the comparator 1210, for providing pen address line signals and pen data line signals to format the customized rasterizer image data signals for printing on the pens 102, 104, 106 (FIGS. 1A–1C). The customized pen driver firmware 1202 is a high speed circuit that allows the pen driver board 1200 to convert the bitmap into control signals for firing the pens 102, 104, 106 (FIGS. 1A–1C) about a 1000 times faster than the pen driver board in the prior art printing station. The conversion of the bitmap into the control signals for firing the pens 102, 104, 106 (FIGS. 1A–1C) is known in the art, and the scope of the invention is not intended to be limited to any particular method thereof.

The 5–12 voltage level shifters 1204 responds to a 12 volt signal, the pen address line signals and the pen data line signal, performs a voltage level shift from 5 volts to 12 voltages, for providing 12 volt level peak-to-peak address signals to the pens 102, 104, 106 (FIGS. 1A–1C), as well as for providing 12 volt peak-to-peak data signals to the high side switch 1206.

The high side switch 1206 responds to the 12 volt peak-to-peak data signals, for providing a high current 12 volt peak-to-peak data signal appropriate for firing the pens 102, 104, 106 (FIGS. 1A–1C) to current sensors 1208.

The current sensors 1208 responds to the high current 12 volt peak-to-peak data signal, senses current for these signals, and provides the high side switch level shifter data signals to the pens 102, 104, 106 (FIGS. 1A–1C), as well as current sensor signals to the 16-to-1 multiplexer 1216.

In operation, the current sensors 1208, the comparator 1210, the differential amplifier 1212, the precision reference 1214 and the multiplexer 1216 combined to perform ink short detection to protect the pen driver boards 1200 from failures resulting from the one or more corresponding pens 102, 104, 106.

The customized pen driver firmware 1202 provides multiplexer control line signals that determines which of the pen driver data signal that is being tested. The multiplexer 1216 responds to the current sensor signals (which is a weak signal) and the multiplexer control line signals, for providing a multiplexed current sensor signal to the differential amplifier 1212 containing information about one of the pen driver signals.

The differential amplifier 1212 responds to the multiplexed current sensor signal, amplifies it, and provides an amplified multiplexed current sensor signal.

The comparator 1210 responds to the amplified multiplexed current sensor signal and a precision reference signal from the precision reference 1214 containing information about a reference value, for providing an ink short detection signal in the form of a comparator differential amplifier multiplexer signal to the customized pen driver firmware 1202. The ink short detection signal is a safety signal that is designed to make sure a bad pen such as pen 102, 104, 106 does not damage one of the customized pen driver boards 1200. In response thereto, the customized pen driver firmware 1202 disables the firing of the one or more pens 102, 104, 106 (FIGS. 1A–1C).

It is also noted that the ground in FIG. 9 is connected to all the circuit elements in FIG. 12.

One important feature of the pen driver board 1200 is that the design is scalable. Therefore, if a fourth pen is added, then a fourth pen board can be added, which is the same and no different from the other three pen boards. This advantage is gained because the customized rasterizer board 1100 (FIG. 11) does not remap data for the pens. In contrast, if the remapping was done in the rasterizer, then adding a fourth pen would significantly impact the remap work you had to do.

Software Steps

The following are software steps for the interface board 1000 (FIGS. 9 and 10) and the customized rasterizer board 1100 (FIGS. 9 and 11).

The interface board software for the interface board 1000 (FIGS. 9 and 10) includes steps related to (A) Host-to-Master-Interface-Board, (B) Interface Board(s)-to-Master-Interface-Board and (C) Master-Interface-board-to-host.

(A) The Host-to-Master-Interface-Board steps include: (1) Detect host transmission by monitoring hardware signals; (2) Receive data via software/hardware handshake protocol; (3) Translate host language to common language; (4) Parse received packet header; (5) Determine destination Interface Board from header; (6) Activate hardware protocol to channel data to proper destination Interface Board; (7) Transmit received data to destination Interface Board; (8) Wait for acknowledge; and (9) Pass acknowledge to host.

(B) The Interface-Board(s)-to-Master-Interface-Board steps include: (1) Detect source's desire to transmit data; (2) Arbitrate common Interface Board bus to enable proper channel of communication; (3) Receive data via software/hardware handshake protocol; (4) Parse received packet header; and (5) Queue received data.

(C) The Master-Interface-Board-to-Host steps include: (1) Translate data to host language (protocol); (2) Initiate data write to host; (3) Transmit data via software/hardware host handshake protocol; and (4) Wait for acknowledge from host.

The Rasterizer Board Software for the rasterizer board 1100 (FIGS. 9 and 11) includes steps related to (A) Data-reception-from-host and (B) Message-Handlers.

(A) The Data reception from host includes the steps of: (1) Detect incoming data; (2) Receive data via software/hardware handshake protocol; (3) Queue received data; (4) Parse received message header; and (5) Dispatch process to handle message.

(B) The Message-Handlers includes steps for Control Messages and Data Messages. The Control Messages steps include: (1) Fonts; (2) Bitmaps and (3) Layout (margin/positioning). The Data Messages steps include: (1) Remove byte from data queue; (2) Index proper font table to acquire character's bitmap; (3) Copy bitmap to raster image in proper location; (4) Repeat until entire message is rasterized; (5) Wait for sensor input signalling package has arrived under print heads; and (6) Transmit image data to pen-driver boards.

Service Station Operation

FIG. 13 shows an alternative embodiment of the cartridge assembly generally indicated as 1300 in relation to a service station assembly generally indicated as 1350 related thereto for wiping clear a nozzle of a pen generally indicated as $P_1$, $P_2$, $P_3$.

As shown, the cartridge assembly 1300 includes a wiper and ink receptacle drive motor 1302, a cartridge lift motor 1304, a cartridge lift shaft 1306, and a power transmission device 1308.

The service station assembly 1350 includes an integral product registration guide 1352 having a receptacle driver pillow block 1354, a pen wiper slot 1356, an SFAI 1358, a waste ink receptacle 1360.

The waste ink receptacle 1360 is a snap in, disposable assembly consisting of a plastic reservoir for waste ink, soft rubber capping seals 1358 and soft rubber pen wipers (not shown). The reservoir is filled with porous foam for absorption and dispersion of waste ink. The assembly slides within the imager base by way of software commanded motors, performing the functions of pen wiping and cleaning, proper nozzle firing verification and capping of the pens when not in use.

Via software control, at pre-determined intervals or upon command, the cartridge lift motor 1304 lifts the imager cartridge assembly 1300 a precise distance. The wiper/ink receptacle driver motor 1302 then drives the waste ink receptacle 1360 under the ink jet pen nose generally indicated as N thereby wiping the pen nozzle areas to remove excess ink residue. After wiping, the pens can then be fired on command into the receptacle to clear out possibly clogged nozzles. The firing of the nozzles is verified by integrated detection circuitry to assure that all nozzles are clear. The waste ink receptacle 1360 can then be either retracted to allow resumed printing or the imager cartridge assembly 1300 can be lowered precisely to allow the seals to cap the pens to prevent drying of the nozzles until next use. Via software control, the waste ink receptacle 1360 can be retracted fully allowing it to be grasped and removed from the imager for disposal and replacement.

It will, therefore, be seen from the above that the invention described admirably achieves the objects of the invention. However, it will be appreciated that departures can be made by those skilled in the art without departing from the spirit and scope of the invention, which is limited only by the following claims.

Having thus described the invention, what is claimed is:

1. An imager comprising:
   a service station assembly having a customized interface board, responsive to an image signal containing an image to be printed on a medium, the image signal having any one of a number of different standard interfaces, for providing an interface board image signal; and
   a cartridge assembly having a customized rasterizer board and one or more customized pen driver boards, the customized rasterizer board being responsive to the interface board image signal, for providing a customized rasterizer board image signal, and the one or more customized pen driver boards being responsive to the customized rasterizer board image signal, for providing customized pen driver board signals to one or more pens for printing the image on the medium.

2. An imager according to claim 1,
   wherein the interface board handles all connections to the outside world, including other imagers, and includes one or more of the following input or output connections: parallel data inputs, a serial data input, a serial data output, a voltage input, a ground input, a paper sensor input and an encoder input.

3. An imager according to claim 1,
   wherein the interface board includes one or more of the following inputs or outputs: an on/off input, a voltage output, a serial data input, a serial data output, a voltage input, a ground output, a paper sensor output, and an encoder output.

4. An imager according to claim 1,
   wherein the interface board further comprises a microcontroller, a differential transceiver, a regulator, a level shifter and filter, a filter, a first buffer and a second buffer.

5. An imager according to claim 4,
wherein the microcontroller responds to parallel port image data signals, for providing an asynchronous serial image data signal; and further responds to a buffered asynchronous serial port signal, for providing a microcontroller asynchronous serial port signal.

6. An imager according to claim 5,
wherein the first buffer responds to the serial data image signal, for providing a buffered serial data image signal; the first buffer further responds to an on/off signal, for providing a buffered on/off signal; and the first buffer further still responds to an asynchronous serial port signal, for providing a buffered asynchronous serial port signal;
wherein the regulator responds to a voltage signal, for providing a regulator voltage signal to a pen firing power supply;
wherein the level shifter and filter responds to a paper sensor output signal, for providing a level shifted and filtered paper sensor output signal;
wherein the level shifter and filter responds to a paper sensor output signal, for providing a level shifted and filtered paper sensor output signal;
wherein the filter responds to an encoder output signal, for providing a filtered encoder output signal;
wherein a second buffer responds to the level shifted and filtered paper sensor output signal, and further responds to the filtered encoder output signal, for providing a buffered level shifted and filtered paper sensor output signal and a buffered 5 volt peak-to-peak filtered encoder output signal.

7. An imager according to claim 1,
wherein the image signal contains information in the form of either ASCII text, bitmaps, logos, indicia, graphics, bar codes, or a combination thereof, for printing on the medium, which may include paper, packages, textiles, labels, calenders, passports, etc.

8. An imager according to claim 1,
wherein the customized rasterizer board builds a raster image to be printed from ASCII text and bitmaps, and sends raster image data to the one or more pen driver boards.

9. An imager according to claim 1,
wherein the customized rasterizer board further comprises a rasterizer buffer, a switching rasterizer power supply, a microprocessor, customized rasterizer firmware, an SRAM, and a flash memory.

10. An imager according to claim 9,
wherein the rasterizer buffer responds to a buffered serial data image signal, for providing a rasterizer buffered serial data image signal; the rasterizer buffer further responds to a microprocessor asynchronous serial port signal, for providing a rasterizer buffered microprocessor asynchronous serial port signal; the rasterizer buffer further responds to a paper sensor signal, for providing a rasterizer buffered paper sensor signal; the rasterizer buffer further responds to an encoder signal, for providing a rasterizer buffered encoder signal; and the rasterizer buffer further responds to an on/off signal, for providing a rasterizer buffered on/off signal.

11. An imager according to claim 10,
wherein the switching power supply responds to a voltage signal, for providing a switching power supply voltage signal.

12. An imager according to claim 10,
wherein the microprocessor responds to the rasterizer buffered serial data image signal, a delayed paper sensor signal, a rasterizer firmware first-in-first-out level signal, a rasterizer firmware address and data output signal, an SRAM address and data bus output signal, a flash memory address and data bus output signal, a pen driver data bus output signal, and a pen driver first-in-first-out level signal, for providing a microprocessor address and data bus output signal in the form of a rasterizer firmware address and data input signal, an SRAM address and data bus input signal and a flash memory address and data bus input signal, as well as a rasterizer pen driver data bus input signal, a rasterizer firmware select signal, a rasterizer firmware configure signal, and a rasterizer firmware encoder signal.

13. An imager according to claim 12,
wherein the SRAM responds to the microprocessor address and data bus output signal, for providing the SRAM address and data bus output signal; and
wherein the flash memory responds to the microprocessor address and data bus output signal, for providing the flash memory address and data bus output signal.

14. An imager according to claim 13,
wherein the flash memory includes a direct memory access.

15. An imager according to claim 1,
wherein either the interface board, the customized rasterizer board, the customized pen driver board, or some combination thereof, is a high density board having multiple tracing layers for providing a modularized imager design.

16. An imager according to claim 1,
wherein the customized rasterizer board or the customized pen driver board has either a programmable logic array (PLA), a programmable array logic (PAL), a field-programmable Gate array (FPGA), or a programmable logic device (PLD), or a combination thereof.

17. An imager according to claim 1,
wherein the rasterizer board has a rasterizer circuit that is firmware and includes sets of microinstructions that specify hardware functions.

18. An imager according to claim 1,
wherein the one or more pen driver boards remap incoming raster data, perform graphic functions, and drive one or more pens.

19. An imager according to claim 1,
wherein the one or more pen driver boards each further comprises a pen driver firmware, 5–12 voltage level shifters, a high side switch, current sensors, a comparator, a differential amplifier, a precision reference and a multiplexer.

20. An imager according to claim 19,
wherein the pen driver firmware responds to a rasterizer pen driver data bus input signal, a rasterizer firmware select signal, a rasterizer firmware configure signal, and a rasterizer firmware encoder signal, level shifter address and data signals, an ink short detection signal, for providing a pen driver data bus output signal, a pen driver first-in-first-out level signal and a multiplexer control line signal.

21. An imager according to claim 20,
wherein the 5–12 voltage level shifters respond to a voltage signal, for providing the level shifter address and data signals;
wherein the high side switch responds to a voltage signal and a level shifter data signal, for providing a high current pen driver data signal; and
wherein the current sensors respond to the high current pen driver data signal, for providing current sensor signals, and for also providing the high current pen driver data signal to the one or more pens.

22. An imager according to claim 21, wherein the multiplexer responds to the current sensor signals and the multiplexer control line signal, for providing a multiplexed current sensor signal;

wherein the differential amplifier responds to the multiplexed current sensor signal, for providing an amplified multiplexed current sensor signal; and wherein the comparator responds to the amplified multiplexed current sensor signal, and further responds to a precision reference signal from the precision reference, for providing a comparator signal containing information about an ink short detection.

23. An imager according to claim 1, wherein the different standard interfaces include an RS232 interface, RS845 interface, a parallel printer port interface, USB interface, or ethernet interface.

* * * * *

UNITED STATES PATENT AND TRADEMARK OFFICE
CERTIFICATE OF CORRECTION

PATENT NO.     : 6,371,672 B1                                    Page 1 of 1
DATED          : April 16, 2002
INVENTOR(S)    : D. Pirie et al.

It is certified that error appears in the above-identified patent and that said Letters Patent is hereby corrected as shown below:

Column 2,
Line 6, ";" should be -- , --.

Column 3,
Line 18, "follows" should be -- following --.

Column 4,
Line 2, "in" should be deleted.

Column 5,
Lines 7 and 45, after "one or" -- more -- should be inserted.

Column 11,
Lines 5-8, "(Nb: it is not clear where this 12.6 volt signal is coming from. Compare your handwritten block diagram of the hardware overview, interface board, etc." should be deleted.

Signed and Sealed this

First Day of April, 2003

JAMES E. ROGAN
*Director of the United States Patent and Trademark Office*